United States Patent
Naresh

(10) Patent No.: US 11,869,229 B2
(45) Date of Patent: Jan. 9, 2024

(54) METHOD AND APPARATUS FOR DEVELOPING A FINGERPRINT RECOGNITION APPARATUS

(71) Applicant: Japan Display Inc., Tokyo (JP)

(72) Inventor: Adithya Naresh, Hayward, CA (US)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/714,141

(22) Filed: Apr. 6, 2022

(65) Prior Publication Data

US 2023/0326187 A1   Oct. 12, 2023

(51) Int. Cl.
G06K 9/28 (2006.01)
G06V 10/774 (2022.01)
G06V 40/12 (2022.01)
G06V 10/82 (2022.01)

(52) U.S. Cl.
CPC .......... *G06V 10/7747* (2022.01); *G06V 10/82* (2022.01); *G06V 40/1365* (2022.01)

(58) Field of Classification Search
CPC .... G06V 40/12–40/1394; G06V 10/70; G06V 10/778–10/7796; G06V 10/82; G06V 10/454; G06V 30/18057; G06T 3/4046; G06T 9/002; G06T 2207/20081; G06T 2207/20084
See application file for complete search history.

(56) References Cited

U.S. PATENT DOCUMENTS 9,235,283 B2 * 1/2016 Setlak ................ G06V 40/1347
2002/0146178 A1 * 10/2002 Bolle ................ G06V 40/1347
                                                              382/254

OTHER PUBLICATIONS

Schuch et al., "De-Convolutional Auto-Encoder for Enhancement of Fingerprint Samples", 2016, IEEE, 7 pages. (Year: 2016).*
Wong et al., "Multi-task CNN for restoring corrupted fingerprint images", Elsevier, Pattern Recognition 101 (2020) 107203, copyright 2020, pp. 1-11. (Year: 2020).*
Bank et al., "Autoencoders", Computer Vision and Pattern Recognition, Machine Learning, arXiv:2003.05991v2, Apr. 3, 2021, pp. 1-22.
Chen et al., "Fingerprint Quality Indices for Predicting Authentication Performance", Lecture Notes in Computer Science, vol. 3546, 10 pages.

* cited by examiner

*Primary Examiner* — Brian Werner
(74) *Attorney, Agent, or Firm* — XSENSUS LLP

(57) ABSTRACT

A method of training a fingerprint image enhancing engine for use in a fingerprint capturing device, and a corresponding apparatus and computer readable medium, include producing a synthetic image dataset comprising plural pairs of synthetic images. Each pair of synthetic images include a clean synthetic image and a raw synthetic image corresponding to the clean synthetic image. Each raw synthetic image is produced according to a model of the fingerprint capturing device. The method also includes training a neural network using the synthetic image dataset.

12 Claims, 12 Drawing Sheets

METHOD AND APPARATUS FOR DEVELOPING A FINGERPRINT RECOGNITION APPARATUS

FIELD OF THE INVENTION

The present disclosure relates generally to the design and implementation of an image pattern recognition capability, and, in particular, to a method and apparatus for developing an implementation specific synthetic image dataset for training a neural network and the process of retraining the neural network with a combination of the synthetic and a raw image dataset, used in an implementation of a fingerprint capture and/or recognition apparatus, and also the resulting fingerprint capture and/or recognition apparatus implementation.

BACKGROUND OF INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

A fingerprint is characterized by the locations and patterns of friction ridges on the fingers or toes of a subject. Hereinafter, the term "friction ridges" and "ridges" are used interchangeably, and the terms "finger" or "toe" are used interchangeably. The ridges are portions of skin that are slightly raised higher from the skin base layer as compared to the height of adjacent valleys formed between the ridges.

Traditionally, a fingerprint of a particular subject is captured by applying ink to the ridges, pressing the fingers or toes against a surface, and capturing an image of the resulting ink pattern left on the surface as a detailed image of the fingerprint. Alternatively, a fingerprint may be captured by using a capacitive sensor to measure distances across various portions of the finger or toe from a surface of the capacitive sensor to a corresponding nearest portion of skin, either a top of a ridge or a top of a valley. By plotting the distances measured across a surface of the finger or toe, the pattern of ridges and valleys, and hence an image of the fingerprint, can be captured. The image of the fingerprint may be compared to known fingerprint images and/or information to recognize the fingerprint.

SUMMARY OF INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

An embodiment of the invention includes a method of training a fingerprint image enhancing engine for use in a fingerprint capturing device, the method includes producing a synthetic image dataset comprising plural pairs of synthetic images, each pair of synthetic images including a clean synthetic image and a raw synthetic image that is a raw equivalent of the clean synthetic image, each raw synthetic image being produced according to a model of the fingerprint capturing device; and training a neural network using the synthetic image dataset.

The method of training the fingerprint image enhancing engine may further include generating the model of the fingerprint capturing device based on electrical and mechanical design constraints for the fingerprint capturing device.

The method of training the fingerprint image enhancing engine may further include producing the raw synthetic image from the corresponding clean synthetic image according to the model of the fingerprint capturing device.

The method of training the fingerprint image enhancing engine may further include generating a mechanical model based on mechanical design constraints for the fingerprint capturing device; performing a mechanical simulation using the mechanical model to produce simulated electrical parameters of the fingerprint capturing device; performing an electrical simulation using the simulated electrical parameters and electrical design parameters of the fingerprint capturing device to produce a range of equivalent transform functions; and generating each raw synthetic image by applying a selected equivalent transform function randomly selected from the range of equivalent transform functions to each corresponding clean synthetic image.

The method of training the fingerprint image enhancing engine may further include, wherein the mechanical design constraints include one or more of a cover glass thickness, a sensor pitch, an adhesive layer thickness, a distance between transmit and receive electrodes, and a sensor stackup thickness.

The method of training the fingerprint image enhancing engine may further include, wherein the electrical design constraints include one or more of an electrode sheet resistance, a mutual capacitance, a delta mutual capacitance, a transmit frequency, an amplifier gain, a multi-drive code, a number of integration cycles, use of single ended vs. differential mode, a display noise level, a charger noise level, a finger moisture level, and an electrically floating phone ground.

The method of training the fingerprint image enhancing engine may further include, wherein the training the neural network using the synthetic image dataset produces synthetic training weights for the neural network, and the method may further include: further training the neural network based on fingerprint images generated by a sensor and analog front end and the synthetic training weights.

The method of training the fingerprint image enhancing engine may further include, wherein the training the neural network using the synthetic image dataset produces synthetic training weights for the neural network, and the method may further include: generating a raw fingerprint image using a sensor and analog front end; processing the raw fingerprint image using the neural network and the synthetic training weights to produce an enhanced fingerprint image; producing a sensor image dataset comprising plural pairs of raw images, each pair of raw images including a raw sensor image and a corresponding clean sample image; adding the raw fingerprint image to the sensor image dataset as a first raw sensor image if the enhanced fingerprint image meets a first predetermined quality constraint; processing the first raw sensor image to produce a processed image that meets a second predetermined quality constraint; and adding the processed image that meets the second predetermined quality constraint to the sensor image dataset as the corresponding clean synthetic image of the first raw sensor image.

Another embodiment of the invention may include an apparatus for training a fingerprint image enhancing engine for use in a fingerprint capturing device, the apparatus including processing circuitry configured as a synthetic image dataset generator configured to produce a synthetic image dataset comprising plural pairs of synthetic images, each pair of synthetic images including a clean synthetic image and a raw synthetic image corresponding to the clean synthetic image, each raw synthetic image being produced according to a model of the fingerprint capturing device; and the processing circuitry further configured as a neural network trainer configured to train a neural network using the synthetic image dataset.

The apparatus may further include, wherein the processing circuitry is further configured to generate the model of the fingerprint capturing device based on electrical and mechanical design constraints for the fingerprint capturing device.

The apparatus may further include, wherein the processing circuitry is further configured to produce the raw synthetic image from the corresponding clean synthetic image according to the model of the fingerprint capturing device.

The apparatus may further include, wherein the processing circuitry is further configured to generate a mechanical model based on mechanical design constraints for the fingerprint capturing device; the processing circuitry is further configured to perform a mechanical simulation using the mechanical model to produce simulated electrical parameters of the fingerprint capturing device; the processing circuitry is further configured to perform an electrical simulation using the simulated electrical parameters and electrical design parameters of the fingerprint capturing device to produce a range of equivalent transform functions; and the processing circuitry is further configured to generate each raw synthetic image by applying a selected equivalent transform function randomly selected from the range of equivalent transform functions to each corresponding clean synthetic image.

The apparatus may further include, wherein the mechanical design constraints include one or more of a cover glass thickness, a sensor pitch, an adhesive layer thickness, a distance between transmit and receive electrodes, and a sensor stackup thickness.

The apparatus may further include, wherein the electrical design constraints include one or more of an electrode sheet resistance, a mutual capacitance, a delta mutual capacitance, a transmit frequency, an amplifier gain, a multi-drive code, a number of integration cycles, use of single ended vs. differential mode, a display noise level, a charger noise level, a finger moisture level, and an electrically floating phone ground.

The apparatus may further include, wherein the processing circuitry is further configured to train the neural network using the synthetic image dataset to produce synthetic training weights for the neural network; and the processing circuitry is further configured to train the neural network based on fingerprint images generated by a sensor and analog front end and the synthetic training weights.

The apparatus may further include, wherein the processing circuitry is further configured to train the neural network using the synthetic image dataset to produce synthetic training weights for the neural network; the processing circuitry is further configured to generate a raw fingerprint image using a sensor and analog front end; the processing circuitry is further configured to process the raw fingerprint image using the neural network and the synthetic training weights to produce an enhanced fingerprint image; the processing circuitry is further configured to produce a sensor image dataset comprising plural pairs of raw images, each pair of raw images including a raw sensor image and a corresponding clean sample image; the processing circuitry is further configured to add the raw fingerprint image to the sensor image dataset as a first raw sensor image if the enhanced fingerprint image meets a first predetermined quality constraint; the processing circuitry is further configured to process the first raw sensor image to produce a processed image that meets a second predetermined quality constraint; and the processing circuitry is further configured to add the processed image that meets the second predetermined quality constraint to the sensor image dataset as the corresponding clean synthetic image of the first raw sensor image.

Another embodiment of the invention includes a non-transitory computer readable medium storing computer instruction which when executed by a computer cause the computer to perform a method of training a fingerprint image enhancing engine for use in a fingerprint capturing device, the method including: producing a synthetic image dataset comprising plural pairs of synthetic images, each pair of synthetic images including a clean synthetic image and a raw synthetic image of the clean synthetic image, each raw synthetic image being produced according to a model of the fingerprint capturing device; and training a neural network using the synthetic image dataset.

Another embodiment of the invention includes a fingerprint capturing device that includes a sensor; an analog front end; and an image enhancing engine including a neural network trained using a synthetic image dataset, the synthetic image dataset including plural pairs of synthetic images, each pair of synthetic images including a clean synthetic image and a raw synthetic image of the clean synthetic image, each raw synthetic image being produced according to a model of the sensor and the analog front end.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

Figure 1:
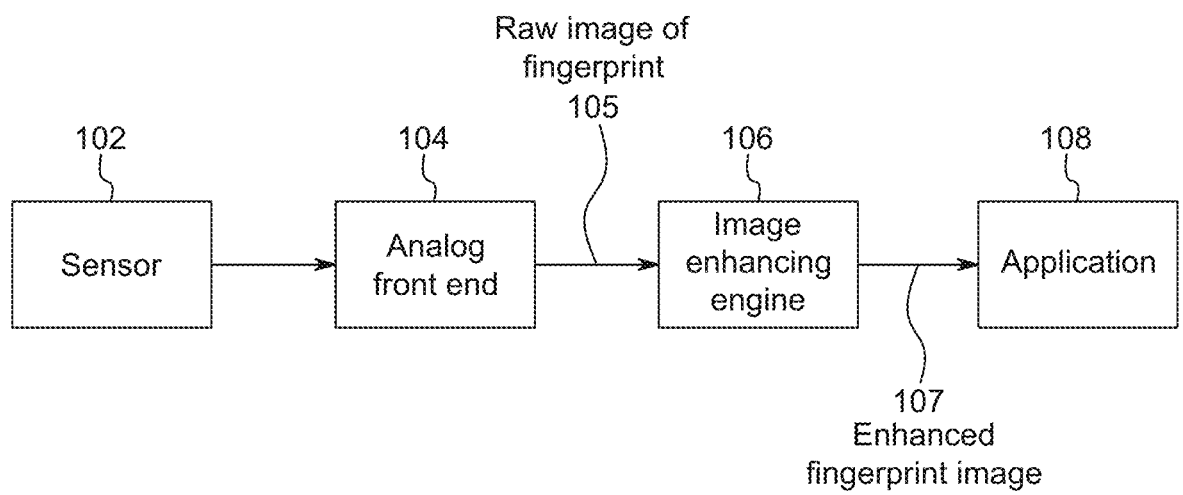
FIG. 1 shows a block diagram of a fingerprint recognition apparatus according to an embodiment of the invention.

FIG. 1 shows a block diagram of a fingerprint recognition apparatus 100 according to an embodiment of the invention. The fingerprint recognition apparatus 100 includes a sensor 102, an analog front end 104, an image enhancing engine 106, and optionally, an application 108. The components may alternatively be configured in a way that merely captures a fingerprint image of sufficient quality that can be used for other purposes by another device. The sensor 102 may be implemented using a plurality of proximity sensors, such as capacitive sensors arranged in an array, which generate a detection signal based on a proximity of an object, such as a fingerprint ridge or valley on a subject's finger. The capacitive sensors in the array may be separated from one another according to a sensor pitch. The capacitive sensors in the array may be arranged according to a particular sensor stackup.

The analog front end 104 amplifies and filters the detection signal output by the sensor 102 to produce a raw fingerprint image 105. The image enhancing engine 106 performs image enhancement on the raw fingerprint image 105 to produce an enhanced fingerprint image 107. The enhanced fingerprint image 107 includes sufficient detail so that a subsequent device, such as the application 108, can perform useful operations on the fingerprint image, such as identifying the subject, extracting fingerprint characteristics, matching the detected fingerprint to a fingerprint in a database, providing access to a protected resource, etc. The application 108 corresponds to any user of the enhanced fingerprint image 107, such as an operating system function or a trigger function for any other operation.

Embodiments of the invention are applicable to standalone fingerprint capture, recognition, or detection devices, as well as fingerprint capture, detection, or recognition devices embedded within other apparatuses (e.g., cellphone, entry pad, computer user interface, safe/strongbox, automotive entry or ignition, home or commercial security, etc.). The fingerprint sensor 102 may be a standalone device or included/overlayed or integrated with a display, button, or other portion of the apparatus. The display may include any display technology, including rigid and/or flexible LED, OLED, or LCD displays. The fingerprint sensor 102 may be capacitive, resistive, and/or optical.

The raw fingerprint image 105 may include defects or imperfections as a result of the particular design constraints laid upon settings and design parameters of the sensor 102 and analog front-end 104. These design constraints may vary from one fingerprint recognition apparatus implementation to another, for example depending upon the operating purpose of the containing apparatus, or environmental requirements. In conventional fingerprint recognition apparatuses, an image enhancing step may generically attempt to enhance the quality of the raw fingerprint image 105, without considering the particular design constraints that apply to the sensor 102 and the analog front end 104 used in a particular implementation of the corresponding fingerprint recognition apparatus. Thus, utilizing a conventional apparatus with raw images affected by the design constraints may result in a suboptimal enhancement of the images. However, an embodiment of the present invention may include an image enhancing engine 106 that has been specially adapted (e.g., by training) to handle the particular kinds of defects or imperfections expected to result from the sensor 102 and analog front end 104 according to the particular design constraints of the apparatus including the image enhancing engine 106.

As fingerprint detection/capture/recognition apparatuses may be used in a variety of applications and environments (e.g., mobile phone, outdoor security system, personal computing, wearable computing, etc. . . . ), and may be implemented with a wide range of possible underlying technologies (e.g., different display technologies, semiconductor fabrication technologies, etc. . . . ) there may a wide range of possible design parameters for the possible implementations. Examples of sensor design variation for the capacitive sensor embodiment include changes in the cover glass thickness 206. For example, an increase in the cover glass thickness 206 may result in a smaller mutual capacitance and hence a smaller fingerprint ridge/valley signal, which would result in lower signal-to-noise ratio in the raw fingerprint image 105. In addition, the optical adhesive layer 202 could also have variations in thickness as well as the dielectric constant. Examples of variation in the analog front end settings include gain of an operational amplifier (op amp) included in the amplifier 214, filter frequencies of tunable passband filter 215, operating frequency of correlator/mixer 217, bit rate of analog to digital converter ADC 219, and other circuit settings.

Figure 2A:
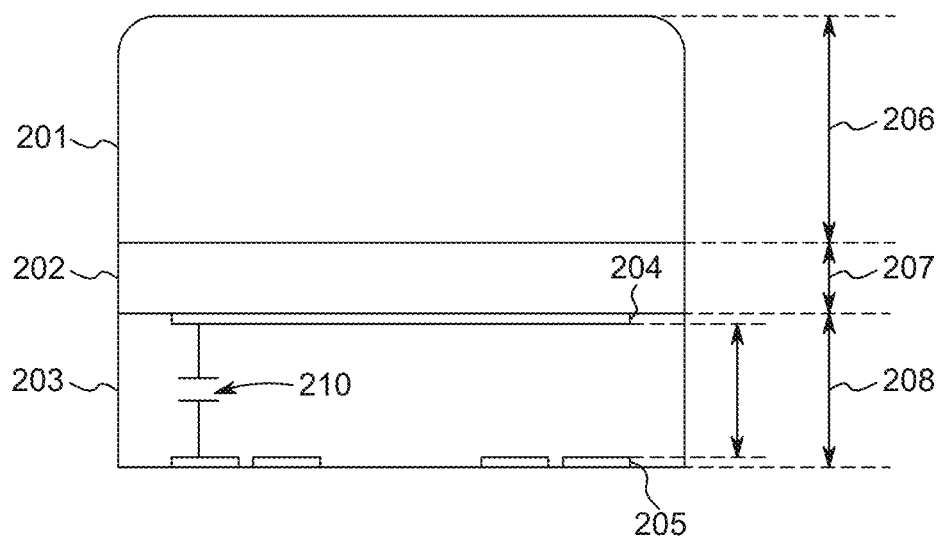
FIG. 2A shows a side view of an embodiment of a capacitive sensor stackup in a sensor.
Figure 2B:
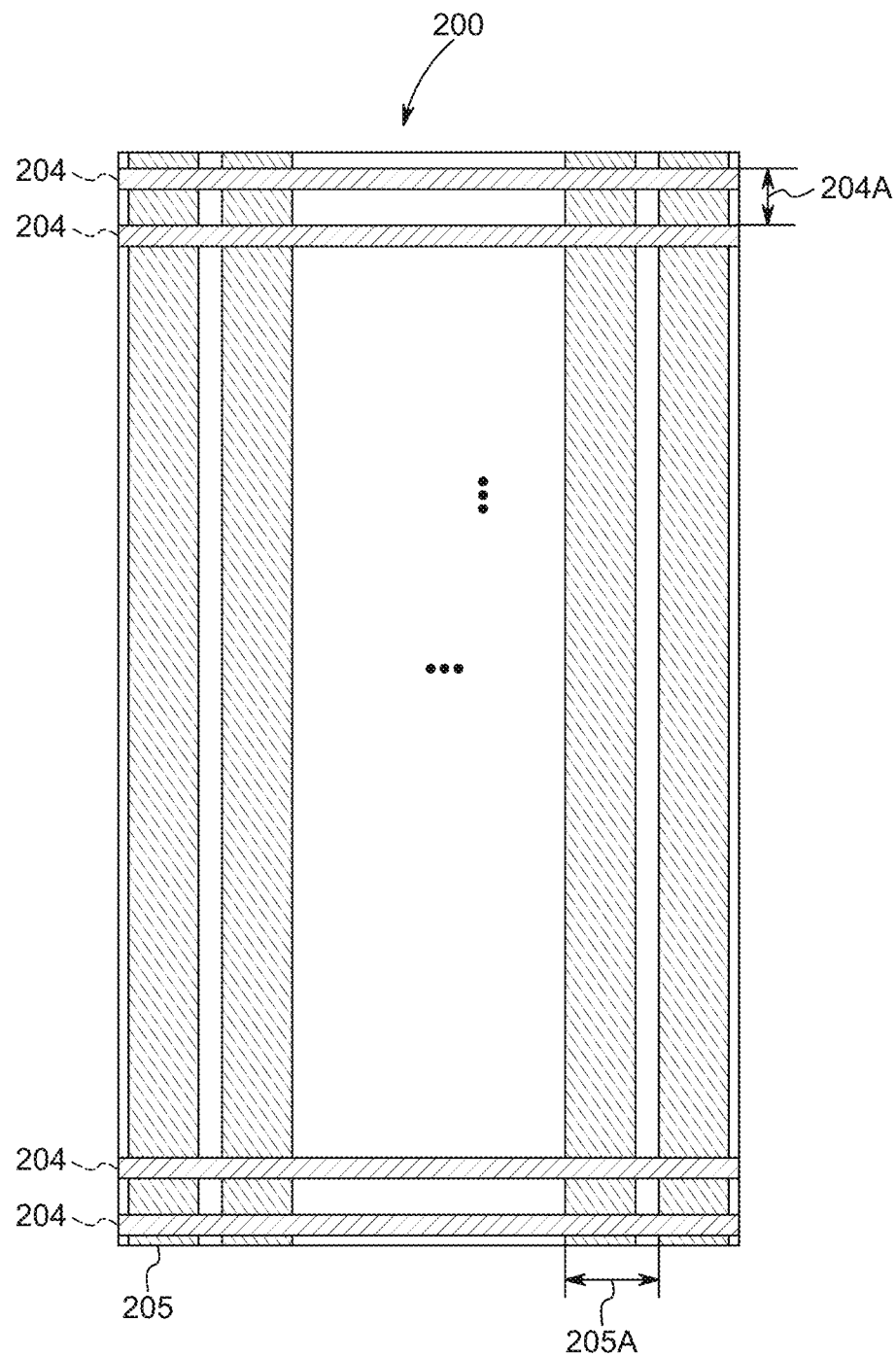
FIG. 2B shows a planar view of an embodiment of a capacitive sensor stackup.

FIG. 2A shows a side view of an example of a capacitive sensor stackup 200 in a sensor 102. FIG. 2B shows a planar view of the capacitive sensor stackup 200. A sensor stackup may have multiple thin slices of electrically non-conductive glass or film type substrates. For example, as shown in FIG. 2A, a stackup includes one cover glass 201 and one sensor substrate 203. Alternative embodiments may include more than one sensor substrates made of glass or film. An optically clear adhesive layer 202 holds the substrates together, and receive and transmit electrodes 204, 205 are embedded within the substrates. The capacitive sensor stackup 200 has a cover glass 201, an optically clear adhesive layer 202, a sensor substrate (aka, sensor glass or film layer) 203, at least one receive electrode 204, and at least one transmit electrode 205 deposited on the top and bottom side, respectively, of the sensor substrate 203 of the capacitive sensor. The receive electrodes 204 are arranged in rows and the transmit electrodes 205 are arranged in columns, as shown in FIG. 2B. The receive electrodes 205 are arranged by vertical pitch 204a. The transmit electrodes 204 are arranged by horizontal pitch 205a. Thickness 206 of the cover glass 201, thickness 207 of the adhesive layer 202, and thickness 208 of the sensor substrate 203 may each be significant in determining the equivalent capacitance between a transmit electrode 204 and a receive electrode 205.

Figure 2C:
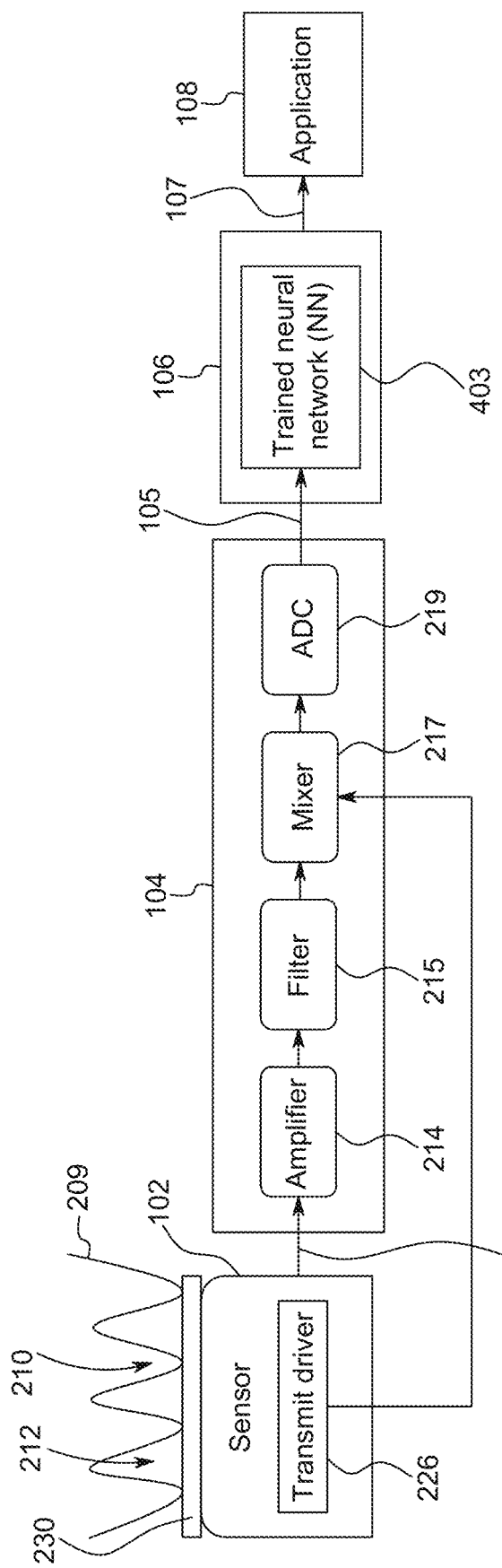
FIG. 2C shows a block diagram of an embodiment of the sensor, AFE, trained neural network, and an application used as a finger capturing device.

FIG. 2C shows an example of using the capacitive sensor stackup 200 in a fingerprint capturing device according to an embodiment of the invention. In the example of FIG. 2C, a subject's finger 209 with a fingerprint having a plurality of ridges 210 and valleys 212, is brought into contact with the cover glass 201. Other design implementations may include cases where one or more additional intervening layers (e.g., protective glass, other functional elements, etc.) are arranged between the subject's finger 209 and the cover glass 201.

The analog front end (AFE) 104 includes circuitry to receive and condition the detection signal 222 generated by the sensor 102 to produce a raw fingerprint image 105. In particular, the AFE 104 includes an amplifier 214 including an op amp. The amplifier 214 may be connected to a filter 215, such as a narrowband filter, which is connected to a mixer 217 which is a circuit configured to convert/rectify AC components to DC based on a frequency of a driver signal used in the transmit driver 226 before getting converted to digital by an analog-to-digital (ADC) converter 219. The amplifier 214 may be configured to operate in a single ended mode or a differential mode. The AFE 104 outputs the raw fingerprint image 105 to an image enhancing engine 106, which in turn outputs the enhanced fingerprint image 107 to an application layer 108. The finger may also have moisture that affects the sensed signal, which is shown as finger moisture level 230.

The image enhancing engine 106 may include a trained neural network 403 that performs a fingerprint image enhancement on the raw fingerprint image 105 output from the analog front end 104. The fingerprint image enhancement may include enhancing and denoising the input raw fingerprint image 105 to produce an enhanced fingerprint image 107 that has sufficient resolution, signal/noise content, and information to allow the application 108 to perform a system level action on the fingerprint. For example, the application 108 may perform a fingerprint match to associate a person's name with the enhanced fingerprint image 107, unlock an operational feature of a system or may output information about the identified subject.

Although sensor 102, AFE 104, image enhancing engine 106, and application layer 108 are shown as separate boxes, they may be implemented separately or combined in any combination within a same hardware, circuit, or processing element (e.g., within a same Application Specific Integrated Circuit (ASIC)).

The quality of the detection signal produced by the sensor and the raw image produced by the AFE 104 are each critical in being able to accurately detect and recognize a subject's fingerprint.

Design parameters/constraints of a particular fingerprint recognition apparatus implementation that may affect detection signal quality include a thickness, design and material of the cover glass, the dimensions of the sensor pitch, and the design and dimensions of the sensor stack-up may impact fingerprint resolution, signal strength, and susceptibility to external noise. Settings and design considerations of the analog front end 104 that may affect detection signal quality include transmit frequency, amplifier gain, quantization ADC noise, multi-drive code, integration cycles, and amplifier operating mode (single-ended vs. differential), as well as other constraints described herein, which may impact the amplification of signal noise, add unpredictable row or column noise, or change an image size.

Transmit frequency refers to the frequency of the signal used to drive the transmit electrodes of the capacitive sensor. Amplifier gain refers to the overall gain value (the signal multiplier) of all the PGA within the AFE, represented by amplifier 214. Quantization ADC noise refers to the noise generated from the error during the conversion from analog to digital domain. For example, translating 0 to 1 V to 0 to $2^8-1$ (255) bits results in $1/255$ volt per bit. The error is equal to $1/(255*2)$.

The signal flowing out of each RX channel 222 and into the AFE 104 is an amplitude and phase attenuated version of the TX signal from the transmit driver 226 traveling through the transmit electrodes 205, the non-conductive layers, and out of a receive electrode 204 after some signal loss to the outside world and the display ground 335. In one embodiment, a single transmit electrode, TX channel 1 for example, is driven by a voltage signal with a certain frequency. The amplitude of that signal flowing out of one RX channel, for example RX channel 1, is a function of the mutual capacitance between the TX1 and RX1 node, i.e. 301A, and the phase of the signal is a function of the total resistance, i.e. 340 elements, encountered across the signal path, as well as other impedance like parasitic capacitance 301B, etc.

Single Ended mode is an operating condition where the signal output of each RX signal is amplified and goes through the AFE signal chain until it is converted to raw fingerprint image. For instance, a 1 pF mutual capacitance across a TX/RX node would manifest as a small current or voltage signal on the corresponding RX channel and then converted to a certain digital value at the end of the AFE signal chain. There is typically a 10 to 25% difference in the signal level detected between the areas of the sensor where a finger is present and the area without a finger present, where the amount of signal difference is directly influenced by the mechanical design constraints. Thus, single ended operating mode typically produces a raw image with a good contrast between the fingerprint area and the background area with no fingerprint present. However, this method has a lower dynamic range in sensing the difference in the signal between the ridge and the valley within the fingerprint region. For instance, a fingerprint ridge can have a mutual capacitance of 1.0005 pF while a valley can have 1 pF (corresponding to a ridge to valley delta mutual capacitance of 0.0005 pF). At the end of the AFE signal chain this small change could result in a very similar ADC count value for the two because of the very small difference.

Differential mode is an operating mode where the AFE amplifies the difference between one RX channel and its adjacent one. In this condition, only the 0.0005 pF difference between one ridge channel and adjacent valley channel would be amplified. However, in this condition, it is harder to separate the fingerprint area from the background. In addition, depending on the finger orientation on the screen, sometimes the adjacent channels might have similar values which could result in certain image channels being degraded.

Other operating conditions that affect detection signal quality include display noise (i.e., electrical noise produced by a display that is in proximity to the sensor 102), charger noise (i.e., electrical noise produced by a power supply or other high voltage signal source), moisture content of the subject's finger 209 (i.e., whether the finger is dry or wet), and the electrical potential difference between the subject's finger and the phone's ground (i.e. in the case when the phone is not physically held by the subject).

Figure 3:
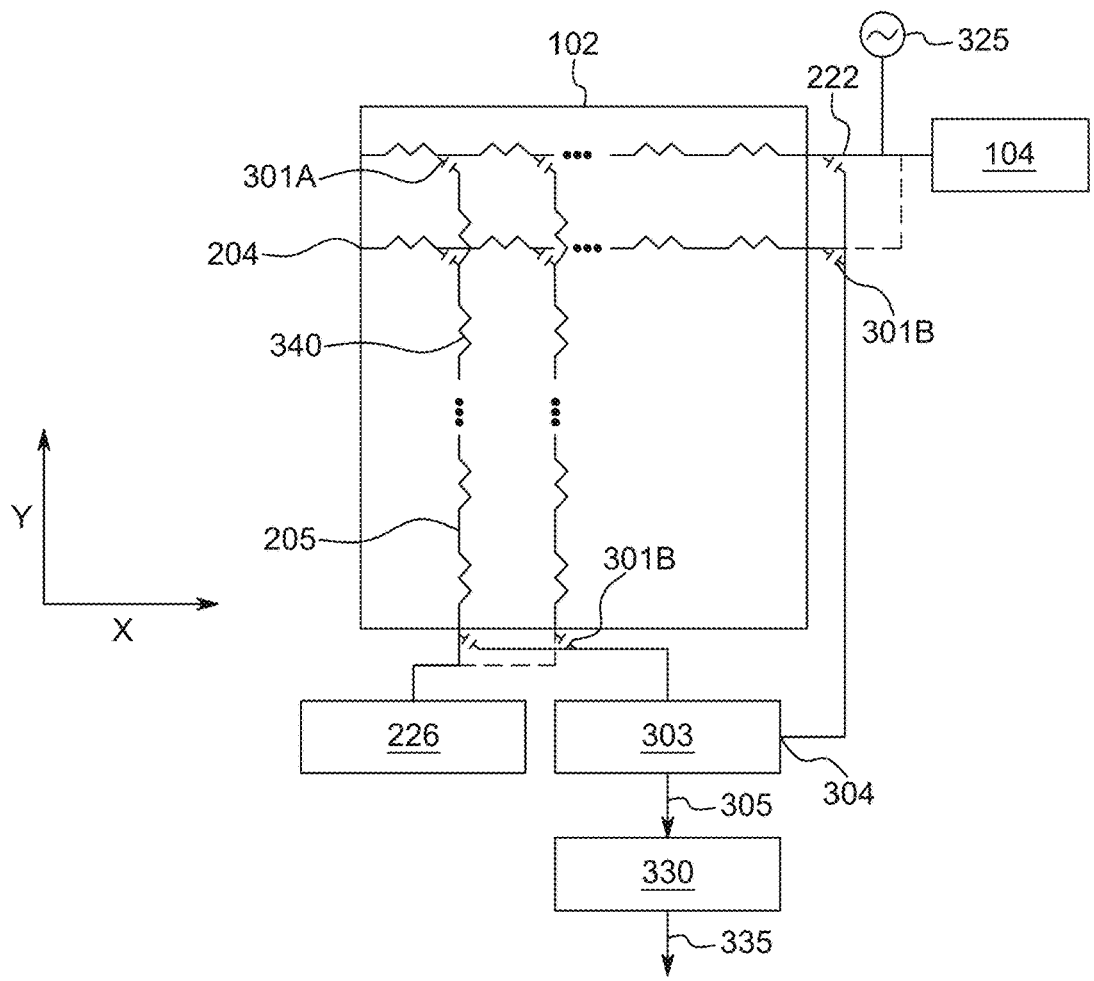
FIG. 3 shows an equivalent circuit diagram of an embodiment of the sensor.

FIG. 3 shows an equivalent circuit diagram of the sensor 102. In this example, electrodes 204 and 205 are each represented as a series of resistances. Capacitance 301a is the mutual capacitance between the transmit electrodes 205 and receive electrodes 204 from a single sensor pixel context. In one embodiment of the sensor 102, the transmit electrode 205 is oriented parallel to the y axis and the receive electrode 204 is oriented orthogonally to the transmit electrode. Transmit driver 226 is a circuit that provides signals with user tunable frequencies. The transmit driver 226 functions to drive the transmit electrodes 205 with an electrical signal with a set frequency, typically between 100 kHz to 400 kHz. The same signal is used by the mixer circuitry 217 in the analog front-end circuit for signal rectification and filtering out other frequencies. Each of the sensor's transmit and receive electrodes 204, 205 also contain a parasitic capacitance 301b by the nature of the physical stackup to the display ground 305 (aka, VCOM (common) electrode). There may be some impedance 330 between the display ground 305 and earth ground 335, for example caused by a human holding the device including the display, or by the display being placed on a surface that is separated from earth ground. A voltage across the impedance 330 is referred to as an electrically floating phone ground. The parasitic capacitance 301b may be a function of the thickness 206 of the cover glass 201. The parasitic capacitance 301b also causes some portion of the display signal 304 output by the display driver circuitry 303 to be coupled to the signal 222, as display noise. A level of the coupled display noise is a design constraint that may be modeled and used as further discussed below. Display driving circuitry 303 drives a display that includes the sensor 102 in this example and includes high speed switching transistors toggling between the VCOM ground signal and a display reference voltage signal. AFE 104 processes signals from the receive (RX) electrodes. Noise from the power supply or other external high frequency circuits may be coupled to the signal 222 as charger noise 325.

A capacitive sensor 102 includes an array of parallelly stacked transmit (TX) 205 and receive (RX) 204 electrodes spaced apart from each other by a non-conductive substrate, which is typically the sensor substrate 203. The capacitance between the two overlapped parallel electrodes can be defined by the following equation:

$$C = \epsilon \frac{A}{d},$$

where $\epsilon$ refers to the dielectric constant which affects electrical permittivity, A is the overlap area between the two electrodes, and d is the distance between the two electrodes. For example, one design parameter, cover glass, increases thickness, which increases d, which would reduce the capacitance (i.e., the charge transfer) between subject's finger 209 and the TX electrodes 205. Thus, increased cover glass thickness 206 may result in a smaller delta mutual capacitance which means a lower and poorer fingerprint signal. Other design parameters may cause a change in $\epsilon$ as well, for example the material in a cover glass may have a dielectric constant between 7 (for soda lime type) to 11 (to sapphire glass type). Higher dielectric value means higher capacitance and thus a better delta mutual signal detection. Each of the raw image pixel values may be represented as a function of the delta mutual capacitance, or more simply as a product of a proportional element representing the entirety of AFE gain and ADC scaling, G, as shown in the following equation: $I_{a,b} = f(\Delta C_{m_{a,b}}) = G * \Delta C_{m_{a,b}}$ (a, b are references used to depict a pixel). Thus, a lower delta mutual capacitance would result in a lower pixel value in the raw image and consequently, a lower signal.

There above-mentioned constraints fall into two main subsets: mechanical and electrical. The mechanical constraints are the first subset of constraints consist of the sensor's design parameters that directly affect the sensor's raw image quality. These are the layout and stackup parameters, including the transmit and receive pitch, and the thicknesses and dielectric constants of the many layers that are sandwiched together in the construction of the sensor. The electrical constraints are the second subset of constraints and include the parameters used in the driving and sensing of the sensor like the settings used in the analog front end like the op-amp gain and offset and transmit frequency and voltage.

Specific examples of dimensions and parameters present in the mechanical constraints include the following: Sensor Pitches 205a and 204a represent the distances between one pixel and the next in the row and column directions, respectively. Sensor pitch directly affects both signal strength and resolution. For example, smaller pitch may correspond to more channels and higher resolution (pixels per inch) and may also mean that each pixel gets a smaller signal because the area of the electrode for that pixel is smaller. Typical sensor pitch values for a capacitive fingerprint sensor array are 30 um to 70 um (around ½ of a typical fingerprint ridge and valley pitch, which is necessary to satisfy the sampling criteria). Optically Clear Adhesive (OCA) may be used for connecting multiple layers in the sensor and display stack up, for example in adhesive layer 202. There is typically at least one OCA layer between the finger and the TX/RX electrode layer. Increase in thickness (mm) of the OCA increases the d distance between finger and the TX/RX electrodes and thus decreases delta mutual capacitance. Typical OCA thickness is in the range of 0.025 mm (or 25 um) to 0.1 mm (100 um). The OCA layer dielectric material inherently has a dielectric constant. More expensive materials may have a higher value, which can allow for more charge to flow between the positive to negative electrode. Typical range of dielectric is from 3 to 5.

Cover glass may be used as a barrier between the outside world (where the finger is located) and the more electrostatic sensitive layers within the fingerprint sensor and other electronics, such as display electronics. There is typically one cover glass layer between the finger and the TX/RX electrode layer, although embodiments of the invention may include additional cover glass layers or may operate without any cover glass layer. Increase in thickness of the cover glass layer increases the d distance between finger and the TX/RX electrodes and thus decreases delta mutual capacitance. Typical range of cover glass thickness is 0.3 mm (300 um) to 1.1 mm (1100 um). The cover glass material inherently has its own dielectric constant, with more expensive materials typically having a higher value. Higher value allows for more charge to flow between the positive to negative electrode. Typical range of cover glass dielectric constant is 7 to 11.

Transparent film may be used as a substrate for depositing the TX and RX electrodes. In some designs the TX and RX electrodes are placed on separate films and combined using an OCA. In other designs TX and RX electrodes are placed on one film layer with an electrode bridge atop a passivation layer that connects either the TX or RX electrode row/column together. Increase in transparent film thickness (mm) increases the d distance between finger and the TX/RX electrodes and thus decreases delta mutual capacitance and consequently the signal level. Typical range of transparent film thickness is 0.1 mm (or 100 um) to 0.3 mm (300 um). The transparent film material inherently has a dielectric constant, with more expensive materials typically having a higher value. Higher value allows for more charge to flow between the positive to negative electrode, and thus typically increases the signal level. Typical range of the transparent film dielectric constant is 5 to 7.

The electrode material has an electrode sheet resistance indicating resistance per unit area based on a thickness of deposition. The electrode sheet resistance is used to determine the resistances of the sensor between various components 340. Higher sheet resistance means higher resistance for any electrical signal traversing across electrode. This increases signal nonuniformity across the sensor, as well as limits the operating frequency of the sensor. Typical range lies around 25 Ohms/sq to 100 Ohms/sq and units are in Ohms per square Typical Values Some typical values for sensor parameters are shown below:
Cover glass material 201 has a typical dielectric range of 7 to 11. Cover glass thickness 206 is typically in the range 0.3 mm to 1.1 mm. Optical Adhesive Material used in adhesive layer 202 has typical dielectric range 3 to 5. Optical Adhesive in adhesive layer 202 has typical thickness 207 in the range of 0.025 mm to 0.1 mm. Sensor Substrate Material in the sensor substrate 203 has typical dielectric range 5 to 7. Sensor Substrate 203 has typical thickness 208 in the range of 0.1 mm to 0.3 mm. Electrode sheet resistance has typical range from 25 Ohms/sq to 100 Ohms/sq.

Size reduction in portable devices, for example cell phones, may correspond to reduction in available distance between the TX/RX electrodes and the display/sensor ground plane Vcom. As this distance decreases, parasitic capacitance (i.e., capacitance between TX/RX electrodes and Vcom) may increase, and higher parasitic capacitance may worsen noise artifacts as well as reduce signal strength. Distance from the display Vcom to TX/RX is typically 0.05 mm to 0.2 mm.

Specific examples of electrical constraints include:

Analog Front End (AFE) (sensor driver/receiver) Settings: Depending on the configurations and numbers of op-amps and filters, and number of bits in A-to-D conversion in the AFE there may be different specific parameters in the settings. Following is a description of particular settings that are common to most designs, as well as an indication of how they affect the raw image output.

Transmit Frequency (50 kHz to 400 kHz): Modifying the TX frequency of the signal 222 and mixer 217 by the transmit driver 226 affects the current/voltage signal going to the RX nodes. The higher the frequency the smaller the signal going to the RX nodes. This is based on the frequency domain representation of capacitance $$-\frac{1}{j\omega C}$$

Multi-drive code: This orthogonal code is used for simultaneously driving multiple TX (with the objective of getting a higher signal) via a frequency, amplitude, phase shift keying, or related method and decoding them on the RX side afterwards. Based on the code being used, the raw image could have artifacts ranging from a saturated channel to uneven synchronization of the different rows in a frame. The code used also determines the raw image output size. Possible codes used for multi-driving include orthogonal Walsh-Hadamard code and similarly generated codes.

Programmable Gain Amplifier (PGA) Gain and Offset settings: These refer to the settings that tune the feedback cap and offset cap of primary and secondary operational amplifiers in the AFE signal chain. Higher gain results in an increase in both signal and noise and change in the offset cap will result in an equivalent offset in the raw data values. Quantization Analog-to-Digital Converter (ADC) Noise: This is the noise produced during analog to digital conversion by the particular AFE hardware.

Integration cycles: This is a setting in the AFE 104, typically during or after the ADC 219 that allows user defined cycles of the signals received to accumulate before they are averaged and dumped into the image register for further use. This is equivalent to a digital averaging filter, where increasing the cycles can help reduce noise but will decrease the frame rate.

Table 1 shows a summary of these possible design constraints:

TABLE 1

| Fingerprint recognition apparatus design constraints | |
|---|---|
| Constraint | Possible Impact to Design |
| Mechanical Design Constraints | |
| cover glass thickness | fingerprint resolution, signal strength, susceptibility to external noise |
| sensor pitch | fingerprint resolution, signal strength, susceptibility to external noise |
| adhesive layer thickness | fingerprint resolution, signal strength, susceptibility to external noise |
| distance between transmit and receive electrodes | fingerprint resolution, signal strength, susceptibility to external noise |
| sensor stackup thickness | fingerprint resolution, signal strength, susceptibility to external noise |
| Electrical Design Constraints | |
| Electrode sheet resistance | Operating frequency range, signal uniformity |
| mutual capacitance | fingerprint resolution, signal strength, susceptibility to external noise |
| delta mutual capacitance | fingerprint resolution, signal strength, susceptibility to external noise |
| transmit frequency | fingerprint resolution, signal strength, susceptibility to external noise |
| amplifier gain | unpredictable row/column noise; signal strength |
| multi-drive code | unpredictable row/column noise; image size |
| integration cycles | unpredictable row/column noise; signal strength |
| single vs. differential mode | row/column noise; image size |

TABLE 1-continued

Fingerprint recognition apparatus design constraints

| Constraint | Possible Impact to Design |
| --- | --- |
| display noise level | noise; image distortion |
| charger noise level | noise; image distortion |
| finger moisture level | noise; image distortion |
| electrically floating phone ground | noise; image distortion |

A conventional image recognition device may use public dataset to train a neural network for image enhancement. However, those conventional devices do not take sensor design characteristics and the variation of AFE settings into account during the training. According to an embodiment of the invention, each of the design parameters noted above are used as inputs in the creation of a curated dataset for a machine learning training process. Using such a curated dataset may play a key role in the efficacy during the training process as well as that of the trained neural network inference output.

An embodiment of the invention utilizes apriori knowledge of the sensor design and AFE settings to synthesize and curate a dataset for use in subsequent enhancing of the raw images once a sensor is manufactured. In addition, an embodiment of the invention may set aside images that could not be enhanced using the a priori synthetic trained neural network and uses them to retrain the neural network to achieve a universal enhancement (i.e., using one trained neural network to enhance sensor data input with different design/AFE setting iterations).

Figure 4A:
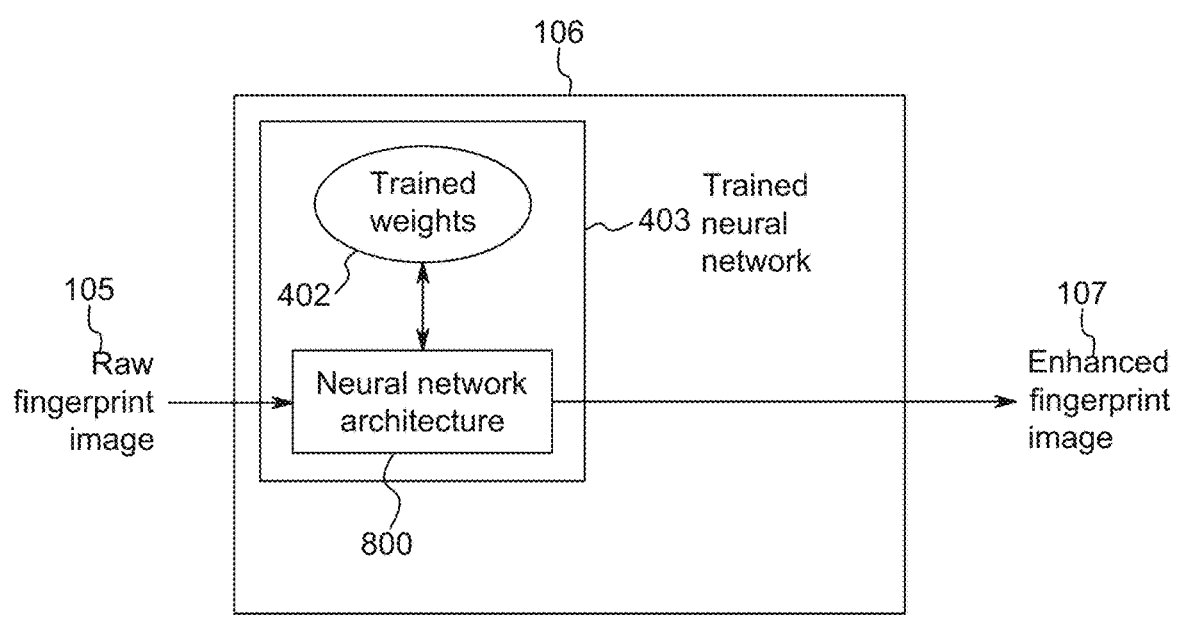
FIG. 4A is a block diagram of an embodiment of an image enhancing engine.

FIG. 4A shows an implementation of an image enhancing engine 106 according to an embodiment of the invention. The image enhancing engine 106 includes a trained neural network 403 that has been trained to receive a raw fingerprint image 105 and output an enhanced fingerprint image 107.

The process of implementing the image enhancing engine 106 using a neural network includes (1) selecting a neural network architecture 800 (i.e., the particular arrangement of structural elements in the neural network) and (2) developing a complete set of trained weights 402 for the neural network architecture 800 (aka, training the neural network) so that when the trained weights 402 are applied to the neural network architecture 800, the resulting trained neural network 403 is capable of accurately and reliably producing an enhanced fingerprint image 107 from a raw fingerprint image 105.

Another embodiment of the present invention includes a method of training the weights 402 of a selected NN architecture 800 based on the design constraints for the sensor 102 and the analog front end 104, as described below. Typically, the selected neural network architecture 800 is an autoencoder convolution neural network with the number, dimensions, and arrangement of processing layers selected based on a tradeoff between the size of the training dataset, training, inference speed, enhancement accuracy, and the NN's target platform.

Figure 4B:
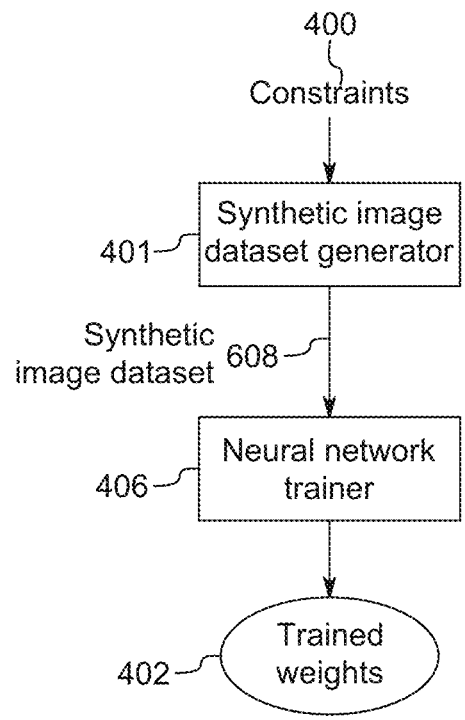
FIG. 4B is a block diagram of method of producing a trained neural network based on a synthetic image dataset according to an embodiment of the invention.

FIG. 4B shows a method of producing a trained neural network 403 according to an embodiment of the invention. The process starts after a design phase in which the values of one or more of the design constraints 400, for example as noted in Table 1, are identified for a desired implementation of a fingerprint recognition apparatus. In a synthetic image dataset generator 401, the design and modeling of the sensor is initially performed according to the design constraints 400. The synthetic image dataset generator 401 produces a synthetic image dataset 608. The synthetic image dataset 608 is received by a neural network trainer 406.

The function of the NN trainer 406 is to train the weights of the elements within the selected NN 800 using the pairs of images in the dataset in an iterative fashion. The standard process in training a neural network involves passing each raw (noisy) dataset image through the NN with current iteration of the weights. The output of the NN, the expected result, for that iteration is compared with the respective clean (ground truth) image in the dataset. The function of the error between the two is used to update the weights before the cycle begins again. This process continues until the error between the expected result from a neural network and the clean data image is minimized, and the trained weights reach a steady state value. The steady state weights are the trained weights 402, that result from training with the synthetic image dataset 608, and the trained weights 405, that result from training with the sensor image dataset 508 (starting from the trained weights 402).

Figure 4C:
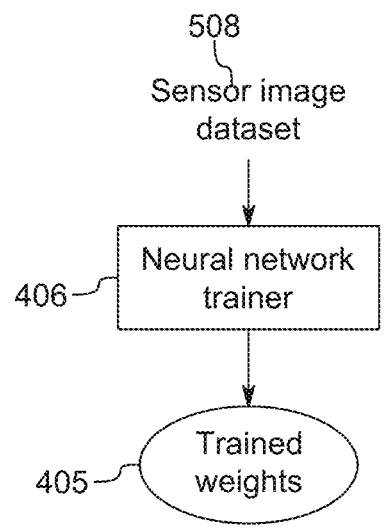
FIG. 4C is a block diagram of a method of producing the trained neural network based on a sensor image dataset according to an embodiment of the invention.

FIG. 4C shows an embodiment of a subsequent iteration of neural network trainer 406 in which the NN 800 is trained using a sensor image dataset 508 to produce trained weights 405.

The following is a mathematical representation and explanation of the NN trainer 406: Given a dataset D containing n samples of R (raw) and C (clean) pairs, equation 1 shows the NN processing of raw (noisy) data R with current weights $W_a$ to generate expected image P for each image in the dataset up to n. Equation 2 shows that the next iteration of Weights $W_{a+1}$ is a function of the current weights $W_a$ and the error between the expected image set P and clean image set C from the dataset D. The process begins again with equation 1 using $NN_{W_{a+1}}$, and continues until P−C is minimized and the difference between current $W_{a+iter}$ and previous weights are also minimized.

$$NN_{W_a}(R_{i=1:n})=P_{i=1:n} \quad \text{(Eq: 1)}$$

$$W_{a+1}=f(W_a,P-C) \quad \text{(Eq: 2)}$$

After the initial apriori NN weight training with synthetic image dataset, the trained NN is ready for use with raw fingerprint images 105 produced by a real world sensor 102 and AFE 104. This version of the NN however, may not be able to sufficiently enhance some severely degraded raw sensor images, particularly ones captured in unpredictable conditions, beyond a quantifiable QS, which in one embodiment is 0.5 out of 1. The raw sensor corner case images 404 are a subset of the raw fingerprint images 105 that cannot be sufficiently enhanced (i.e., QS is less than 0.5) by the NN trained with current weights.

Figure 5:
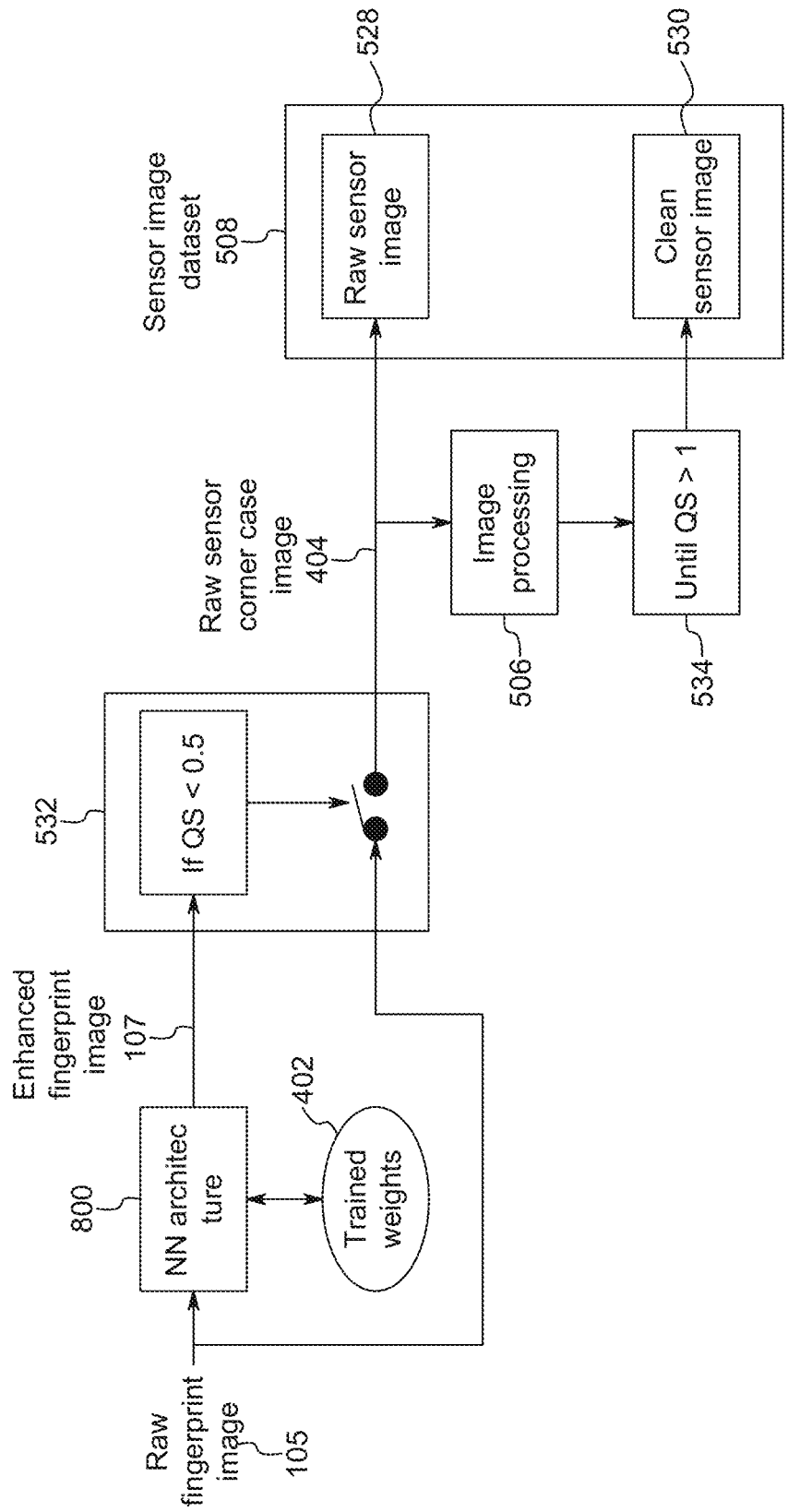
FIG. 5 is a block diagram of a method of producing a sensor image dataset according to an embodiment of the invention.

In order to improve the neural network weights with these real-world images, a sensor image dataset 508 is generated using the raw sensor corner case images 404. As shown in the example of FIG. 5, raw sensor corner case images 404 are raw fingerprint images 105 for which processing by the NN architecture 800 using trained weights 402 (i.e., trained weights resulting from training with the synthetic image dataset 608) results in an enhanced fingerprint image 107 having a QS less than 0.5, as selected by image selector 532. A sensor image dataset 508 is built from the raw sensor corner case images 404 and corresponding clean sensor image 530. The clean sensor images 530 are generated by performing image processing 506 on each of the raw sensor corner case images 404 until the processing results in an image having a QS>1, and the resulting image is added to the sensor image dataset 508 as the clean sensor image 530.

Figure 6A:
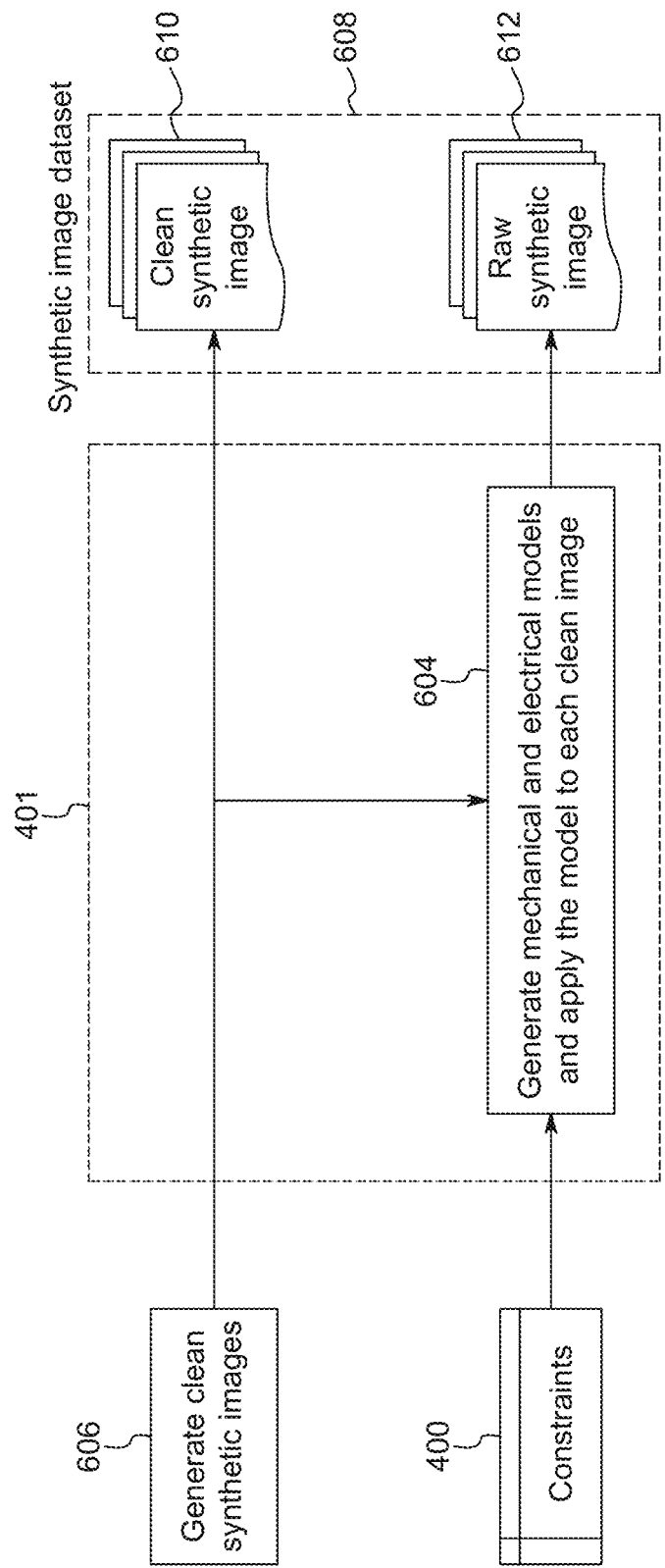
FIG. 6A is a block diagram of a method of producing a synthetic image dataset according to an embodiment of the invention.

FIG. 6A shows an embodiment of the synthetic image dataset generator 401 that produces the synthetic image dataset 608. The synthetic image dataset 608 includes pairs of synthetically generated fingerprint images. Each pair includes a clean synthetic image 610 and a corresponding raw synthetic image 612. The clean synthetic image 610 is an ideal fingerprint image that corresponds to the raw synthetic image 612, which represents a flawed, non-ideal fingerprint image that simulates an image that might have been produced by a sensor 102 and AFE 104 according to the design constraints 400.

The pairs of images in the synthetic image dataset 608 (i.e., clean synthetic image 610 and raw synthetic image 612) are used in one or more initial training iterations of neural network trainer 406 to produce trained weights 402. The neural network trainer 406 operates according to known neural network training process to develop weights for a neural network to produce ideal fingerprint images (e.g., clean synthetic image 610) from raw images (e.g., raw synthetic images 612).

During subsequent iterations, the neural network trainer 406 may further develop the trained weights based on a sensor image dataset 508 as shown in the embodiment of FIG. 4B. The sensor image dataset 508 is generated as shown in the embodiment of FIG. 5 based on the raw sensor corner case images 404, which are essentially low-quality raw sensor fingerprint image 105 produced by the target sensor 102 and AFE 104 or some other sensor 102 and AFE 104 (e.g., a generic sensor/AFE combination). The neural network trainer 406 may further produce the trained weights 405 based on the pairs of clean sensor image 530 and raw sensor image 528 in the sensor image dataset 508.

One primary metric, Quality Score (QS), is designed to keep track of the fingerprint quality during the image processing flow. QS is designed such that a clean fingerprint that can be authenticated will have a QS greater than or equal to a predetermined approval threshold, for example approximately 1.0, and a fingerprint that cannot be authenticated will have QS less than a predetermined rejection threshold, for example, approximately 0.5.

QS of an image is computed from the weighted sums of donut shaped masked regions of its 2D FFT containing the fingerprint region divided by the rest of the image normalized between 0 to 1 using a reference. QS may be calculated as any metric known in the field.

FIG. 6A shows an example of the synthetic image dataset generator 401 which generates a synthetic image dataset 608 from synthetic fingerprints and constraints 400 according to an embodiment of the invention. A synthetic image dataset 608 is created according to an embodiment of the invention to take into account the design constraints 400 when training the neural network. A sensor image dataset 508 is also generated, because the synthetic image dataset 608 might not have sufficient variation in noise and other image characteristics that are advantageously used for training a neural network to correct raw images from certain sensors according to an embodiment of the invention.

A conventional synthetic image generation program 606 may be used to create clean synthetic fingerprint images, which are saved in the synthetic image dataset as clean synthetic image 610. A corresponding noisy image, i.e., raw synthetic image 612, for each clean synthetic image 610 is created according to an embodiment of the invention by applying noise and signal characteristics extracted from simulations from sensor and display models of the target sensor 102 and AFE 104. In particular, in step 604, electrical and mechanical models of the target sensor 102 and AFE 104 according to the constraints are generated and then the models are applied to each generated synthetic image from 606 to produce a corresponding raw synthetic image 612. The step 604 of generating and applying the constraint model to the generated synthetic image can be implemented in several ways, as described below, with the goal of generating raw synthetic images 612 that reproduce the particular way a target sensor 102 and AFE 104 might produce non-ideal (i.e., less than perfect) fingerprint samples due to the constraints 400. Thus, by creating these raw synthetic images 612 that represent or model the way that the target sensor 102 and AFE 104 might produce raw samples, and using this synthetic image dataset 608 to produce trained weights 402 for a neural network, the resulting trained neural network 403 can be accurately trained to correct for those imperfections during the design process, even without use of a physical copy of the actual target sensor 102 and AFE 104 during the training/design process.

Thus, according to an embodiment of the invention, the synthetic image dataset 608 is prepared based on the design constraints 400 of the target system using synthetically generated fingerprints samples. In a conventional approach, clean synthetic fingerprints are only modified using random noise and other factors that have no relevance to raw sensor data to be corrected.

According to an embodiment of the invention, the synthetic image dataset 608 may be prepared based on the design constraints of the target system, for example as in the following examples of modifying clean synthetic images 610 using simulation and/or a model.

As a first example, optical fingerprint sensors may often have defects, called "dark spots," that arise from the manufacturing process. According to an embodiment of the invention, a raw synthetic images 612 of a clean synthetic image 610 can be created by adding one or more dark spot defects to the corresponding clean synthetic image 610. Then, a neural network using trained weights 402 that were trained with that clean synthetic image 610 may be better able to remove similar artifacts during fingerprint recognition operation.

As a second example, other artifacts that can be simulated include different multi drive orthogonal codes that are applied onto the TX lines. Some of these codes can result in saturated row or column channels in addition to additive noise. For instance, one common orthogonal code that is used in multi-drive applications is the Hadamard code. However, the first channel of this code contains all ones which results in all the signal lines adding up to the code size n. One way of creating a raw equivalent image is by a weighted arithmetic operation (typically addition or pixel wise multiplication) of a particular noise source N to the clean data sample C. Another approach is to combine N and C in the frequency domain and convert it back into spatial domain.

Figure 6B:
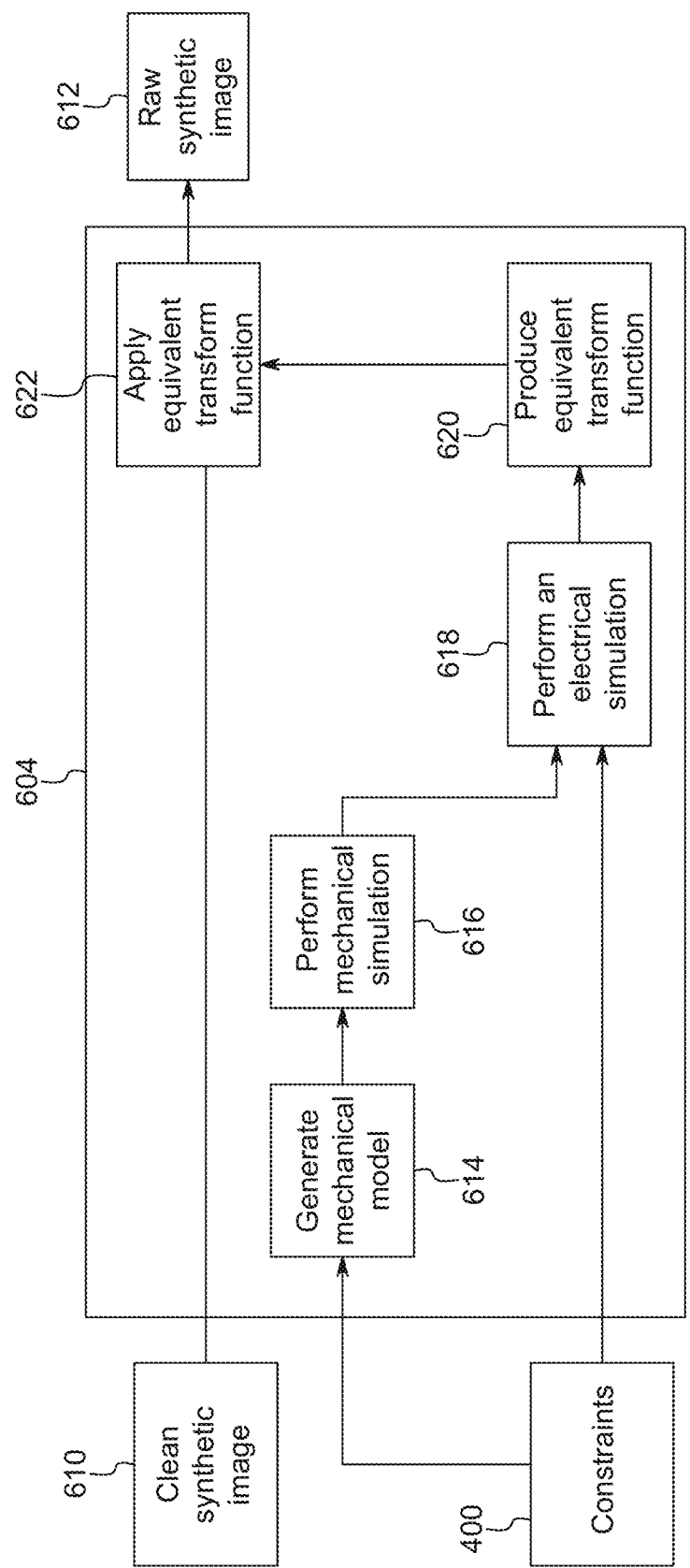
FIG. 6B is a block diagram of a method of using a model of the sensor and AFE constraints to produce the images of the synthetic image dataset according to an embodiment of the invention.

Applying constraints in step 604 may be performed in order to generate raw equivalent images from a generated clean synthetic image as shown in in FIG. 6A. First the possible effects of the various constraints on the raw image are computed via simulation, manufacturing, and similar mathematical and statistical models. Then the results of those constraints, which are typically in a vector or array form are combined with the generated clean synthetic images as described in the previous section and below FIG. 6B is an embodiment of the model generation and application of constraints step 604 and shows in greater detail the process by which the various design constraints 400 are used to generate an approximation of a corresponding raw image given a generated clean synthetically generated image prior, without the use of a physical sensor. In step 614, a mechanical model of the sensor 102 is created from mechanical constraints in the constraints 400, as shown in Table 1. The mechanical constraints in the case of a capacitive sensor embodiment include the physical stackup constraints like the ones shown in FIG. 2A and layout geometry constraints as shown in FIG. 2B. The mechanical or physical model of the sensor is a scaled representation of the full sensor. For instance, in the capacitive sensor case, while the full capacitive sensor might have 1000 transmit and 1000 receive electrodes, the model typically contains a 3×3 to a 7×7 representation of the sensor design for computational efficiency for the next simulation step. The mechanical model is typically three dimensional and is formed using polygons, like cuboids, which represent the outlines of each layer of the sensor stackup. The shape of the transmit, receive, and ground electrodes are also accurately depicted in this model. In addition, a physical model of the fingerprint consisting of a series of conductive cylindrical concentric circles representing the ridges and valleys is used to help determine the difference in the capacitance during the next simulation step.

In step 616, a mechanical simulation is performed using the mechanical model of the sensor 102 (e.g., stackup and layout parameters) and a fingerprint (e.g., ridge and valley dimensions) and the designs according to the design constraints to extract electrical parameters of the modeled sensor/finger. For instance, in the capacitive sensor case, one of the ways to obtain the electrical parameters from a physical model is to use a numerical solving approach called Finite Element Analysis. This approach first divides a physical model to small geometrical elements. Then for this application, the magnitude and the direction of electrical field vectors passing through all the elements with respect to electrical potential of the electrodes can be obtained by solving partial differential equations, in particular, Gauss' law, and then capacitance can be obtained from the result. The resistance information is computed from discretized elements of the transmit and receive electrodes and the electrode sheet resistance constraint. Since the capacitance and resistance result from this simulation is of small size due to the subsampled model, the result is rescaled using interpolation to match the transmit and receive nodes of the real sensor.

An electrical simulation 618 is executed using the electrical parameters from step 616 and the electrical constraints in the constraints 400, as shown in Table 1. For instance, in the capacitive sensor example, the electrical constraints include the transmit frequency, analog front-end settings, including op amp gain and offset, integration cycles, differential or single-ended op amp mode, and external noise such as display and charger noise. The electrical parameters obtained from step 616, include the electrical network of resistance and capacitance elements that make up the sensor.

The objective of the electrical simulation for the capacitive sensor case, is to solve and obtain a time domain voltage representation of each pixel from the receive end of the sensor while driving the transmit side of the sensor with a time varying voltage signal. One way to accomplish this is by using a SPICE simulator. The simulator performs AC, DC, transfer function, and noise analysis to obtain a voltage representation that accurately captures the effects of the constraints.

The results of the electrical simulation 618, for the capacitive sensor example, is an array of voltage ranges. In the case of the capacitance sensor, each voltage range in the array corresponds to an effect of the corresponding mutual capacitance of one sensor transmit and receive node. The nonuniformity between the voltage ranges captures the resistance between each node. The voltage ranges are then digitized by a voltage-to-counts analog-to-digital conversion in step 620 to produce a range of equivalent transform functions. The digitized voltage range array corresponds to one frame of the raw sensor data.

In step 622, a randomly selected one of the range of equivalent transform functions is applied to each synthetic clean synthetic image 610 to produce a corresponding raw synthetic image 612.

The process of applying the more realistic background noise and fingerprint ridge and valley signal distributions (i.e., range of equivalent transform functions) 622 contained in the ADC digitized frame(s) to the synthetic clean synthetic image is as follows:

- Normalize both the synthetic image and the digitized image delta frame (fingerprint frame subtracted from baseline frame) between 0 and 1 such that the fingerprint ridge and valley signal lies closer to 1 in both the cases.
- Isolate the fingerprint foreground area from the background for the synthetic clean images and the digitized frames.
- From the digitized frame, store the distribution of the values of the background and fingerprint region row and columns using simple statistical methods (mean and standard deviation) along with a histogram that contains the number of pixels for a range of values.
- Then apply the distribution on the background region of the synthetic clean image by changing the values of each row and column based on the histogram distribution of the digitized frame. Once these steps are applied the raw equivalent synthetic fingerprint image will possess the characteristics of the digitized frame containing the effects of the constraints and can then be used in NN training along with its clean synthetic counterpart.

Additional random and pseudo-random effects like manufacturing defects in the pixels can be applied on top of the newly created raw equivalent synthetic image.

Embodiments of the invention include adding any other artifacts that may be known to those familiar with the manufacturing and production processes of a particular fingerprint target apparatus (i.e., a particular display material, particular fabrication technique) corresponding clean synthetic images 610 to thereby create raw equivalent images 612 having simulated versions of those artifacts for neural network training purposes.

Figure 9:
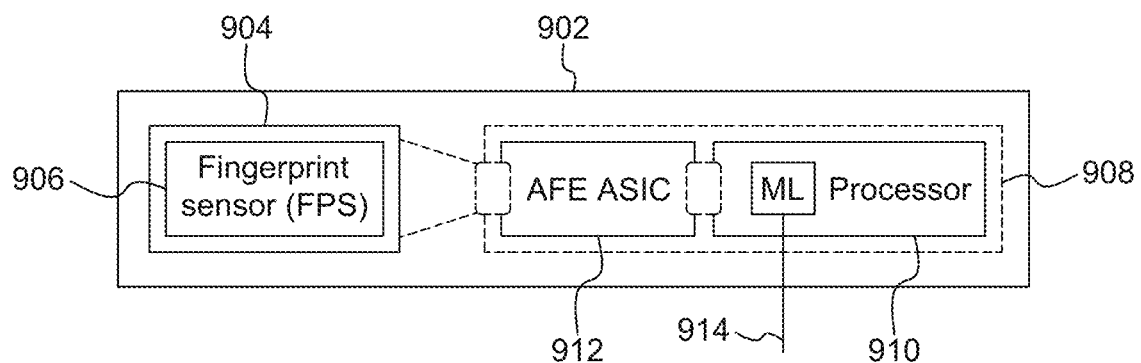
FIG. 9 is a block diagram of an end user system that includes a fingerprint recognition or detection apparatus according to an embodiment of the invention.

Weights specifically refer to the kernel weights and bias values that make up the primary components of a convolutional neural network (CNN). A CNN is composed of interconnected layers, some with bypass or feedback loops, and each layer consists of multiple kernels or filters, for example as shown in FIG. 9. A kernel is a n×n matrix that is applied in a convolution operation. Convolution is a sliding matrix multiplication operation where a smaller n×n matrix, where n typically varies from 3 to 9 or sometimes larger, is multiplied with another larger matrix, for instance, an image matrix.

In a conventional methodology, a combination of synthetic and raw sensor data is not used to train the neural network. Furthermore, according to an embodiment of the invention, the raw equivalent images of the synthetic image dataset are tailored from the system design models to reflect those condition (i.e., sensor design, AFE, etc.), which is not the case in a conventional approach. The approach presented in this invention significantly improves the neural network inference output image quality compared to the conventional approach because the neural network is tuned to the system and sensor generating the raw data.

Figure 7:
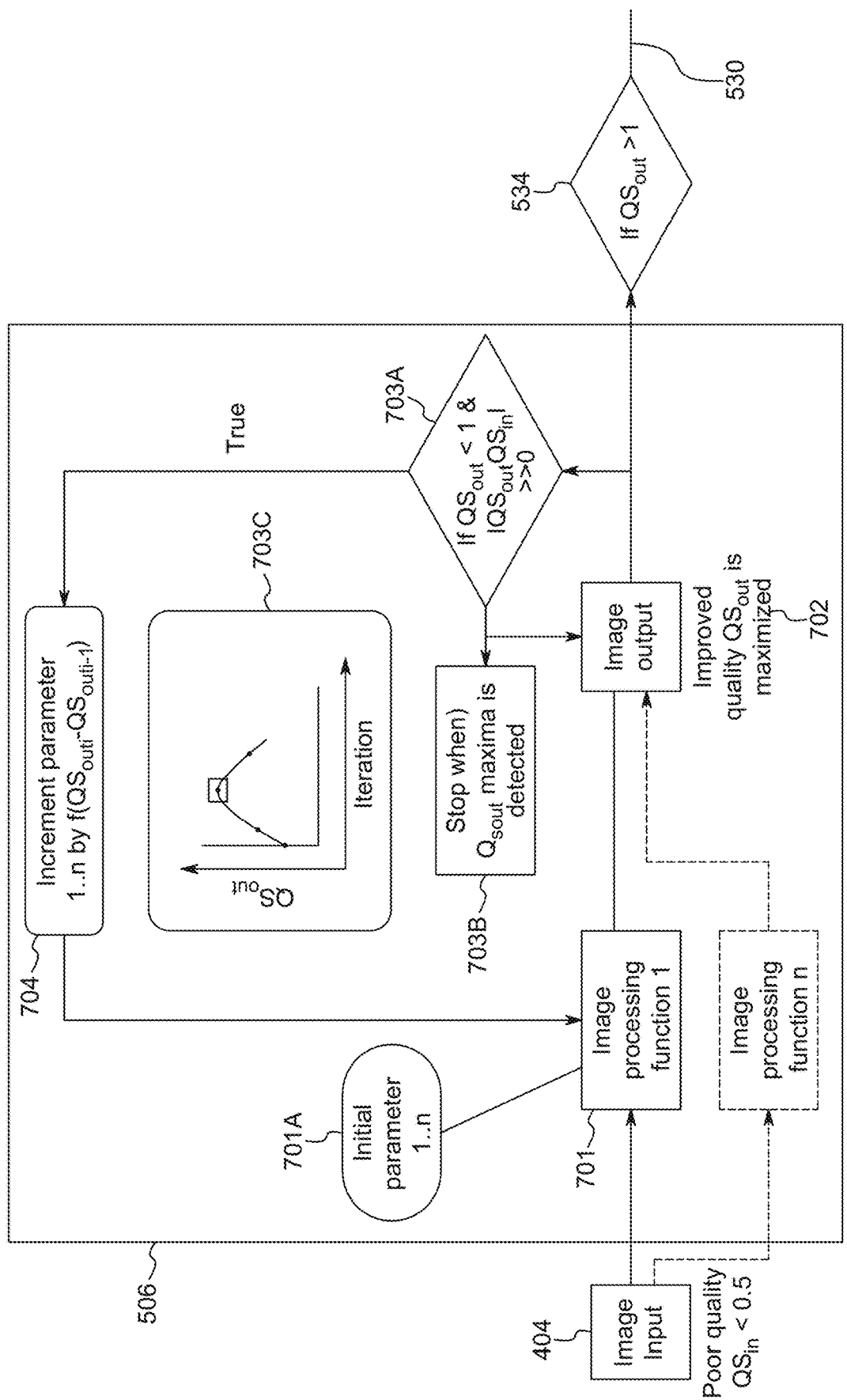
FIG. 7 is a block diagram of the operation of the image processing block according to an embodiment of the invention.

FIG. 7 shows an embodiment of the image processing 506, which receives the raw sensor corner images 404. Each of these raw sensor corner images 404 are passed through a series of image processing functions 701, each with one or more (1 to n) initialized self-tuning parameters 701a. The functions 701 include filters such as moving average median filter with a window parameter, and Laplacian filter with a strength parameter. The image output of the functions 701 is provided to a function 702 which produces a $QS_{out}$ value for the image output of the functions 701. If the $QS_{out}$ value is greater than $QS_{in}$ (i.e., a QS value of the raw corner image 404), and if $QS_{out}$ is less than 1, as shown in 703a, then each of a function's parameters are incremented as a function of the difference between current iteration's and prior iteration's $QS_{out}$ 704. The function's parameters are considered tuned once the $QS_{out}$ reaches a maximum value 703b. 703C illustrates a typical curve of the iterative process of maxima detection for the selection of the best QS. One way of maxima detection is using a method called gradient ascent, where the difference and the slope between one iteration and the next decreases as the maxima gets closer.

The image processing functions 701 generally perform the following operations: identification and removal of noise patterns, the latter which includes the use of several types of filters for noise mitigation, segmentation of the image to separate background (non-fingerprint) and the foreground (fingerprint) area, and contrast and contour improvement of the ridges and valleys in the fingerprint area.

Each operation contains multiple functions with parameters that are auto adjusted iteratively based on the process explained in FIG. 7. For example, if an input sample is contaminated by a strong row/line noise determined by the intensity of the lines, then noise rejection filter is applied, and its parameter, filter strength is adjusted in an iterative fashion until the QS of the image after noise rejection filter is the maximum QS possible. If the $QS_{out}$ of the image output after completing all the image processing operations is greater than or equal to 1, as shown by 534, then the raw sensor corner case image 404, as the raw sensor image 528, and the corresponding clean sensor image 530 are stored in the sensor image dataset 508.

The image processing 506 may clean out noise and other artifacts that are included in raw image outputs of fingerprint sensors. Image processing functions 701 may include functions to enhance an image may include analyzing/extracting image noise, separating foreground and background image portions, applying local histogram equalization, removing extraneous noise, and/or enhancing contours.

The image processing functions 701 include functions that may be used manually by a conventional design methodology. By training a neural network using clean images that have been processed according to these functions, the trained neural network (using trained weights 402) becomes able to implicitly and automatically achieve effects in processed images similar to what might be achieved by manual performance of those functions on the images. Some images from that dataset are not able to be enhanced sufficiently (QS>1) with existing pretrained neural network because they contain noise and signal degradation that deviates from the simulation models used to train that neural network. These images, specifically the poorer quality ones with QS<0.5, will now be processed using a certain combination of filters/functions. For instance, one dataset might need only custom noise removal, and a custom function for foreground fingerprint area and background separation, to generate a corresponding clean fingerprint image with QS>1. Once the sensor image dataset and the synthetic image dataset are used to retrain the existing neural network, then the resulting retrained neural network is better able to perform similar noise removal and foreground/background separation on outlier raw input data.

Compared to conventional architecture, the architecture according to an embodiment of the invention is designed for lightweight execution speed and efficient image enhancement after training. Alternatively, the components of the system may be separately arranged in different elements, including cloud-based elements or separate devices. The analog front end 104, image enhancing engine 106, and application 108 may all be implemented within a same system-on-chip (SOC) processor, or portions of one or more of those may be implemented in different hardware or software. Further, the SOC may be included in the user device 110, such as a cellular phone, or may be installed in a separate device.

Figure 8:
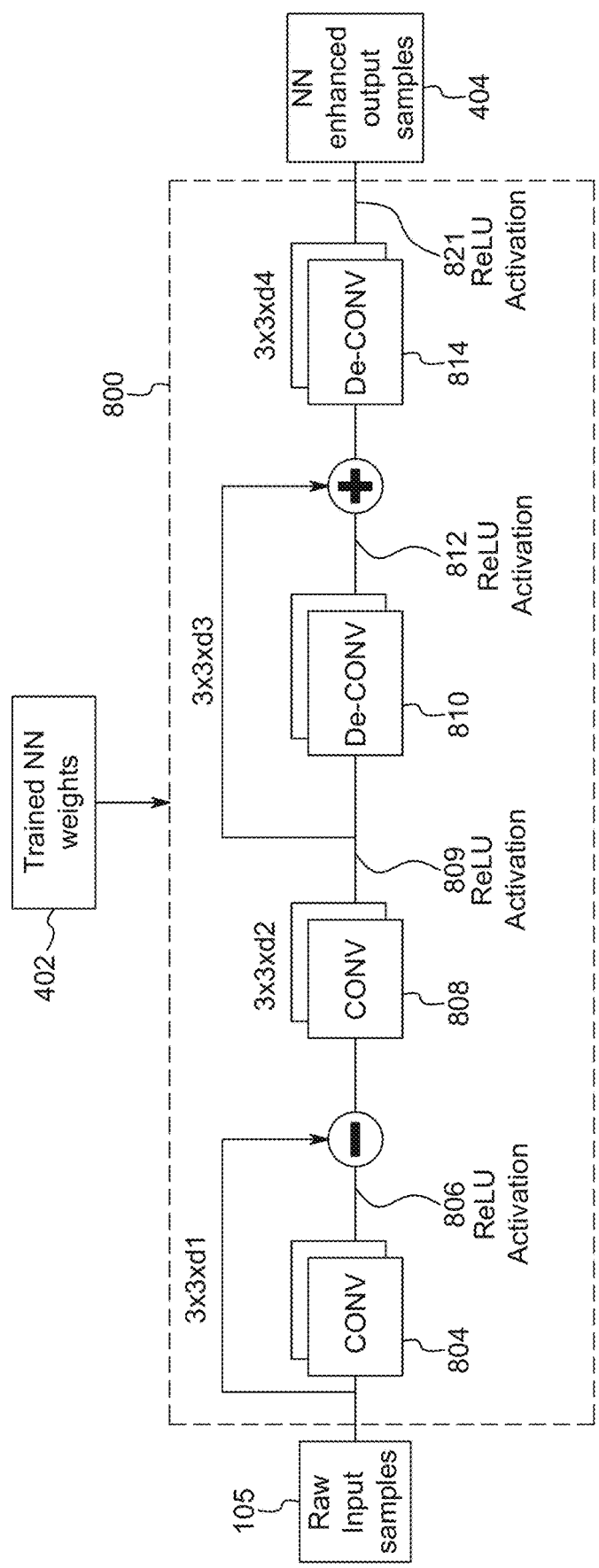
FIG. 8 is a block diagram of a hardware architecture of a neural network according to an embodiment of the invention.

FIG. 8 shows an example of the hardware architecture 800 used with trained NN weights 402 to form a trained NN 403 that receives raw fingerprint image 105, applies a first convolution 804, which performs an adaptive low pass filtering on the input images 802, with a 3×3×d1 kernel, where d1 is the depth of the first convolution 804 (number of filters on this layer). Rectified Linear Unit (ReLU) activation 806 is performed on the results of the first convolution 804. The ReLU activation 806 may highlight only the fingerprint contours in the image, while setting the rest of the image area to black. Each ReLU layer 806, 809, 812, and 816 in FIG. 8 may perform a thresholding type operation to increase high level feature availability for the next layer. A second convolution 808 is performed on the result of the ReLU activation 806. In the second convolution 808, adaptive segmentation (separating foreground from background) is performed, while removing noise, according to a 3×3×d2 kernel. Another ReLU activation 809 may be performed on the result of the second convolution, followed by a first deconvolution 810, which may sharpen the contrast in the fingerprint area of the image according to a 3×3×d3 kernel. Next, ReLU Activation 812 is performed on the results of the first deconvolution 810. Finally, to produce output image 816, a second deconvolution 814 is performed on the results of the ReLU activation 821. The second deconvolution combines the outputs of 808 and 801 while adding final image sharpening adjustments.

In a conventional fingerprint recognition apparatus, the neural network doesn't have an input image feedforward path where it gets subtracted from the first convolution (aka, layer 1) 804 and corresponding ReLU 806 output prior to going into convolution 808 (aka, layer 2). In addition, the conventional methodology also does not include a feedforward path between layer 2 output, after 809, and layer 3, 810 and its ReLU, 812, output. This feedback included according to the embodiment of the invention may advantageously strengthen the edges and curves between the ridge and valley. By adding layer 3 output to layer 2 according to an embodiment of the invention, the recognition effectiveness is improved without a significant increase in computation cost.

Training a neural network for an image enhancing engine 106 according to an embodiment to of the invention may advantageously result in faster convergence (number of iterations and time) on a trained set of weights that meet the design criteria, and a reduction in the error used in determining the optimal neural network weights.

Another embodiment of the invention includes a neural network that results from the training process described herein. Such a trained neural network may advantageously produce a trained inference output (i.e., the output of the trained neural network) that enhances raw sensor data for authentication across multiple design iterations, utilizing neural network parallel processing engines in hardware for fast and efficient inferencing rather than creating custom code per design iteration for performing the same enhancement task.

Using a trained neural network 403 that was trained using the design constraints according to this embodiment, the resulting fingerprint recognition apparatus is better able to recognize raw fingerprint images that are of poor quality.

Figure 10:
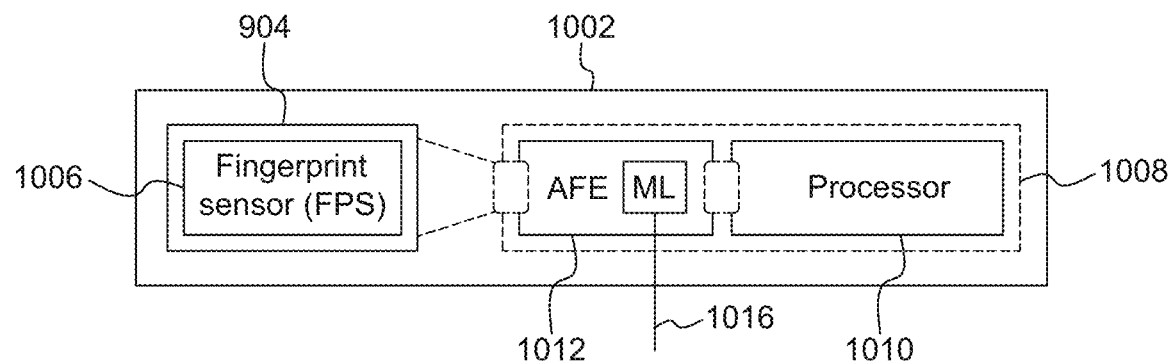
FIG. 10 is a block diagram of another end user system that includes a fingerprint recognition or detection apparatus according to an embodiment of the invention.

FIGS. 9 and 10 show examples of end user systems that may include the fingerprint recognition apparatus according to embodiments of the invention. FIG. 9 shows a mobile phone 902 including a display 904 having a fingerprint sensor (FPS) 906 (corresponding to sensor 102), an electronic circuit 908 including AFE ASIC 912 (corresponding to AFE 104), and a processor 910 programmed to perform the machine learning neural network function 914 (corresponding to the image enhancing engine 106) and also perform application functions (corresponding to application 108). Although a function of the image enhancing engine 106 is performed by the programmed processor in this example, the function of the image enhancing engine 106 may alternatively be performed by a dedicated hardware device designed to perform that function and that interfaces to the processor 910.

FIG. 10 shows a related embodiment of a mobile phone 1002 in which the AFE 1012 includes a programmed processor or dedicated hardware device 1016 to perform the image enhancing engine function 106, while the processor 1010, included on the electronic circuit 1108, may perform the function of the application 108.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Methods and systems described herein may be implemented using computer programming or engineering techniques including computer software, firmware, hardware or any combination or subset thereof, wherein the technical effects may include at least processing of data according to the present disclosure.

Figure 11:
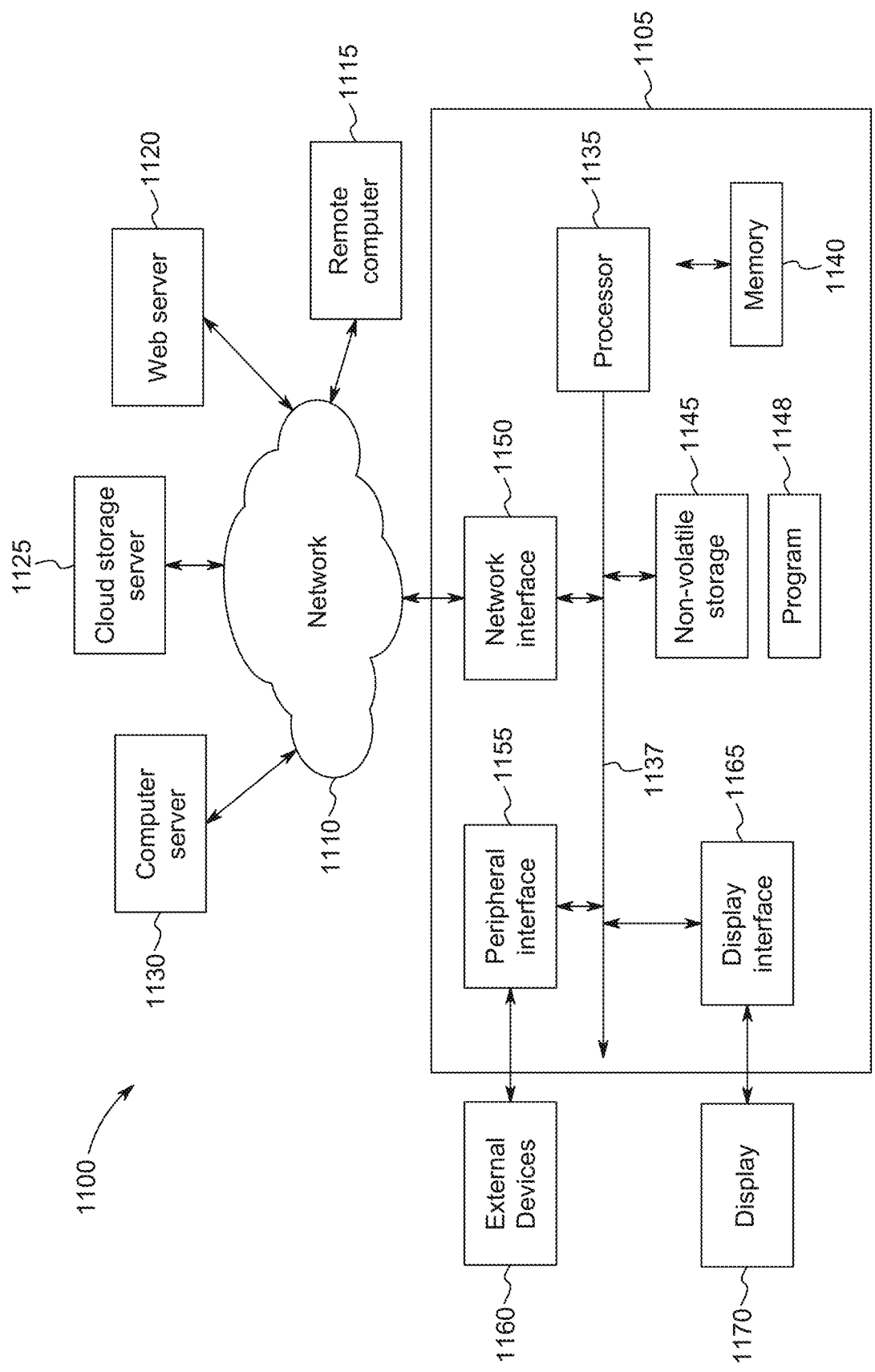
FIG. 11 is a block diagram of a computer or related circuitry that implements an embodiment of the invention.

FIG. 11 illustrates a block diagram of a computer or related circuitry that may implement at least portions of the various embodiments described herein, such as the image enhancing engine 106 and the application 108. Control aspects of the present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible and non-transitory device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD), MO, and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions implementing the functions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C#or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 11 is a functional block diagram illustrating a networked system 1200 of one or more networked computers and servers. In an embodiment, the hardware and software environment illustrated in FIG. 11 may provide an exemplary platform for implementation of the software and/or methods according to the present disclosure. Referring to FIG. 11, a networked system 1100 may include, but is not limited to, computer 1105, network 1110, remote computer 1115, web server 1120, cloud storage server 1125 and computer server 1130. In some embodiments, multiple instances of one or more of the functional blocks illustrated in FIG. 11 may be employed.

Additional detail of a computer 1105 is also shown in FIG. 11. The functional blocks illustrated within computer 1105 are provided only to establish exemplary functionality and are not intended to be exhaustive. And while details are not provided for remote computer 1115, web server 1120, cloud storage server 1125 and computer server 1130, these other computers and devices may include similar functionality to that shown for computer 1105. Computer 1105 may be a personal computer (PC), a desktop computer, laptop computer, tablet computer, netbook computer, a personal digital assistant (PDA), a smart phone, or any other programmable electronic device capable of communicating with other devices on network 1110.

Computer 1105 may include processor 1135, bus 1137, memory 1140, non-volatile storage 1145, network interface 1150, peripheral interface 1155 and display interface 1165. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 1135 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm. Bus 1137 may be a proprietary or industry standard high-speed parallel or serial peripheral interconnect bus, such as ISA, PCI, PCI Express (PCI-e), AGP, and the like.

Memory 1140 and non-volatile storage 1145 may be computer-readable storage media. Memory 1140 may include any suitable volatile storage devices such as Dynamic Random-Access Memory (DRAM) and Static Random-Access Memory (SRAM). Non-volatile storage 1145 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 1148 may be a collection of machine-readable instructions and/or data that is stored in non-volatile storage 1145 and is used to create, manage and control certain software functions that are discussed in detail elsewhere in the present disclosure and illustrated in the drawings. In some embodiments, memory 1140 may be considerably faster than non-volatile storage 1145. In such embodiments, program 1148 may be transferred from non-volatile storage 1145 to memory 1140 prior to execution by processor 1135.

Computer 1105 may be capable of communicating and interacting with other computers via network 1110 through network interface 1150. Network 1110 may be, for example, a local area network (LAN), a wide area network (WAN) such as the Internet, or a combination of the two, and may include wired, wireless, or fiber optic connections. In general, network 1110 can be any combination of connections and protocols that support communications between two or more computers and related devices.

Peripheral interface 1155 may allow for input and output of data with other devices that may be connected locally with computer 1105. For example, peripheral interface 1155 may provide a connection to external devices 1160. External devices 1160 may include devices such as a keyboard, a mouse, a keypad, a touch screen, and/or other suitable input devices. External devices 1160 may also include portable computer-readable storage media such as, for example, thumb drives, portable optical or magnetic disks, and memory cards. Software and data used to practice embodiments of the present disclosure, for example, program 1148, may be stored on such portable computer-readable storage media. In such embodiments, software may be loaded onto non-volatile storage 1145 or, alternatively, directly into memory 1140 via peripheral interface 1155. Peripheral interface 1155 may use an industry standard connection, such as RS-232 or Universal Serial Bus (USB), to connect with external devices 1160.

Display interface 1165 may connect computer 1105 to display 1170. Display 1170 may be used, in some embodiments, to present a command line or graphical user interface to a user of computer 1105. Display interface 1165 may connect to display 1170 using one or more proprietary or industry standard connections, such as VGA, DVI, DisplayPort and HDMI.

As described above, network interface 1150, provides for communications with other computing and storage systems or devices external to computer 1105. Software programs and data discussed herein may be downloaded from, for example, remote computer 1115, web server 1120, cloud storage server 1125 and computer server 1130 to non-volatile storage 1145 through network interface 1150 and network 1110. Furthermore, the systems and methods described in this disclosure may be executed by one or more computers connected to computer 1105 through network interface 1150 and network 1110. For example, in some embodiments the systems and methods described in this disclosure may be executed by remote computer 1115, computer server 1130, or a combination of the interconnected computers on network 1110.

Data, datasets and/or databases employed in embodiments of the systems and methods described in this disclosure may be stored and or downloaded from remote computer 1115, web server 1120, cloud storage server 1125 and computer server 1130.

Numerous modifications and variations of the present invention are possible in light of the above teachings. It is therefore to be understood that within the scope of the appended claims, the invention may be practiced otherwise than as specifically described herein.

What is claimed is:

1. A method of training a fingerprint image enhancing engine for use in a fingerprint capturing device, the method comprising:
   producing a synthetic image dataset comprising plural pairs of synthetic images, each pair of synthetic images including a clean synthetic image and a raw synthetic image corresponding to the clean synthetic image, each raw synthetic image being produced according to a model of the fingerprint capturing device;
   training a neural network using the synthetic image dataset;
   generating the model of the fingerprint capturing device based on electrical and mechanical design constraints for the fingerprint capturing device;
   generating a mechanical model based on mechanical design constraints for the fingerprint capturing device;
   performing a mechanical simulation using the mechanical model to produce simulated electrical parameters of the fingerprint capturing device;
   performing an electrical simulation using the simulated electrical parameters and electrical design parameters of the fingerprint capturing device to produce a range of equivalent transform functions; and
   generating each raw synthetic image by applying a selected equivalent transform function randomly selected from the range of equivalent transform functions to each corresponding clean synthetic image.

2. The method of training the fingerprint image enhancing engine according to claim 1, wherein the raw synthetic image is produced from the corresponding clean synthetic image according to the model of the fingerprint capturing device.

3. The method of training the fingerprint image enhancing engine according to claim 1, wherein the mechanical design constraints include one or more of a cover glass thickness, a sensor pitch, an adhesive layer thickness, a distance between transmit and receive electrodes, and a sensor stackup thickness.

4. The method of training the fingerprint image enhancing engine according to claim 1, wherein the electrical design constraints include one or more of an electrode sheet resistance, a mutual capacitance, a delta mutual capacitance, a transmit frequency, an amplifier gain, a multi-drive code, a number of integration cycles, use of single ended vs. differential mode, a display noise level, a charger noise level, a finger moisture level, and an electrically floating phone ground.

5. The method of training the fingerprint image enhancing engine according to claim 1, wherein the training the neural network using the synthetic image dataset produces synthetic training weights for the neural network, and the method further comprising:
   further training the neural network based on fingerprint images generated by a sensor and analog front end and the synthetic training weights.

6. A method of training a fingerprint image enhancing engine for use in a fingerprint capturing device, the method comprising:
   producing a synthetic image dataset comprising plural pairs of synthetic images, each pair of synthetic images including a clean synthetic image and a raw s Trithetic image corresponding to the clean synthetic image, each raw synthetic image being produced according to a model of the fingerprint capturing device;
   training a neural network using the synthetic image dataset;
   generating a raw fingerprint image using a sensor and analog front end;
   processing the raw fingerprint image using the neural network and the synthetic training weights to produce an enhanced fingerprint image;
   producing a sensor image dataset comprising plural pairs of sensor images, each pair of sensor images including a raw sensor image and a corresponding clean sensor image;
   adding the raw fingerprint image to the sensor image dataset as a first raw sensor image if the enhanced fingerprint image meets a first predetermined quality constraint;
   processing the first raw sensor image to produce a processed image that meets a second predetermined quality constraint; and
   adding the processed image that meets the second predetermined quality constraint to the sensor dataset as the corresponding clean sensor image that corresponds to the first raw sensor image.

7. An apparatus for training a fingerprint image enhancing engine for use in a fingerprint capturing device, the apparatus comprising:
   processing circuitry configured as a synthetic image dataset generator configured to produce a synthetic image dataset comprising plural pairs of synthetic images, each pair of synthetic images including a clean synthetic image and a raw synthetic image corresponding to the clean synthetic image, each raw synthetic image being produced according to a model of the fingerprint capturing device;
   the processing circuitry is further configured as a neural network trainer configured to train a neural network using the synthetic image dataset;
   the processing circuitry is further configured to generate the model of the fingerprint capturing device based on electrical and mechanical design constraints for the fingerprint capturing device;
   the processing circuitry is further configured to generate a mechanical model based on mechanical design constraints for the fingerprint capturing device;

the processing circuitry is further configured to perform a mechanical simulation using the mechanical model to produce simulated electrical parameters of the fingerprint capturing device;

the processing circuitry is further configured to perform an electrical simulation using the simulated electrical parameters and electrical design parameters of the fingerprint capturing device to produce a range of equivalent transform functions; and the processing circuitry is further configured to generate each raw synthetic image by applying a selected equivalent transform function randomly selected from the range of equivalent transform functions to each corresponding clean synthetic image.

8. The apparatus according to claim 7, wherein the processing circuitry is further configured to produce the raw synthetic image from the corresponding clean synthetic image according to the model of the fingerprint capturing device.

9. The apparatus according to claim 7, wherein the mechanical design constraints include one or more of a cover glass thickness, a sensor pitch, an adhesive layer thickness, a distance between transmit and receive electrodes, and a sensor stackup thickness.

10. The apparatus according to claim 7, wherein the electrical design constraints include one or more of an electrode sheet resistance, a mutual capacitance, a delta mutual capacitance, a transmit frequency, an amplifier gain, a multi-drive code, a number of integration cycles, use of single ended vs. differential mode, a display noise level, a charger noise level, a finger moisture level, and an electrically floating phone ground.

11. The apparatus according to claim 7, wherein:

the processing circuitry is further configured to train the neural network using the synthetic image dataset to produce synthetic training weights for the neural network; and the processing circuitry is further configured to train the neural network based on fingerprint it cages generated by a sensor and analog front end and the synthetic training weights.

12. An apparatus for training a fingerprint image enhancing engine for use in a fingerprint capturing device, the apparatus comprising:

processing circuitry configured as a synthetic image dataset generator configured to produce a synthetic image dataset comprising plural pairs of synthetic images, each pair of synthetic images including a clean synthetic image and a raw synthetic image corresponding to the clean synthetic image, each rave synthetic image being produced according to a model of the fingerprint capturing device;

the processing circuitry is further configured as a neural network trainer configured to train a neural network using the synthetic image dataset;

the processing circuitry is further configured to train the neural network using the synthetic image dataset to produce synthetic training weights for the neural network;

the processing circuitry is further configured to generate a raw fingerprint image using a sensor and analog front end;

the processing circuitry is further configured to process the raw fingerprint image using the neural network and the synthetic training weights to produce an enhanced fingerprint image;

the processing circuitry is further configured to produce a sensor image dataset comprising plural pairs of sensor images, each pair of sensor images including a raw sensor image and a corresponding clean sensor image;

the processing circuitry is further configured to add the raw fingerprint image to the sensor image dataset as a first raw sensor image if the enhanced fingerprint image meets a first predetermined quality constraint;

the processing circuitry is further configured to process the first raw sensor image to produce a processed image that meets a second predetermined quality constraint; and the processing circuitry is further configured to add the processed image that meets the second predetermined quality constraint to the sensor dataset as the corresponding clean sensor image that corresponds to the first raw sensor image.

* * * * *